(12) United States Patent  
McNeely et al.

(10) Patent No.: US 8,814,679 B2  
(45) Date of Patent: Aug. 26, 2014

(54) RIVET MECHANISMS

(75) Inventors: Brian McNeely, Redmond, WA (US);
Steven Petofalvi, Redmond, WA (US);
Dean Russell, Redmond, WA (US);
Rory Johnston, Redmond, WA (US);
Yukimi Shimura, Redmond, WA (US);
Philip Brodsky, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 167 days.

(21) Appl. No.: 13/156,762

(22) Filed: Jun. 9, 2011

(65) Prior Publication Data

US 2011/0306414 A1 Dec. 15, 2011

Related U.S. Application Data

(60) Provisional application No. 61/354,494, filed on Jun. 14, 2010.

(51) Int. Cl.
*A63F 9/24* (2006.01)

(52) U.S. Cl.
USPC .............................................. 463/31; 463/37

(58) Field of Classification Search
CPC .................... A63F 2300/6054; A63F 2300/64; A63F 2300/6018
USPC ......................................................... 463/31, 37
See application file for complete search history.

(56) References Cited

U.S. PATENT DOCUMENTS

| 5,577,185 | A | * | 11/1996 | Tunnell et al. ................ 345/473 |
| 6,155,926 | A |  | 12/2000 | Miyamoto et al. |
| 2004/0259637 | A1 |  | 12/2004 | Kimura et al. |
| 2006/0094502 | A1 | * | 5/2006 | Katayama et al. .............. 463/31 |
| 2007/0202949 | A1 |  | 8/2007 | Kawade et al. |

OTHER PUBLICATIONS

"SimCity 3000" Amazon.com. Online. Accessed via the Internet. Accessed Dec. 14, 2012. <URL: http://www.amazon.com/SimCity-3000-Pc/dp/B00000G16I/ref=sr_1_1?ie=UTF8&qid=1355505436>.*

"SimCity 3000 Manual" Electronic Arts. 1998. Accessed via the Internet. Accessed Dec. 14, 2012. <URL:http://www.replacementdocs.com/download.php?view.813>.*

* cited by examiner

*Primary Examiner* — Dmitry Suhol
*Assistant Examiner* — Carl V Larsen
(74) *Attorney, Agent, or Firm* — Nixon & Vanderhye P.C.

(57) ABSTRACT

A method and apparatus that utilizes techniques for modifying the game space of a video game displayed on a display screen by inserting structural elements which become part of the game space and can interact with various game characters.

6 Claims, 28 Drawing Sheets

303

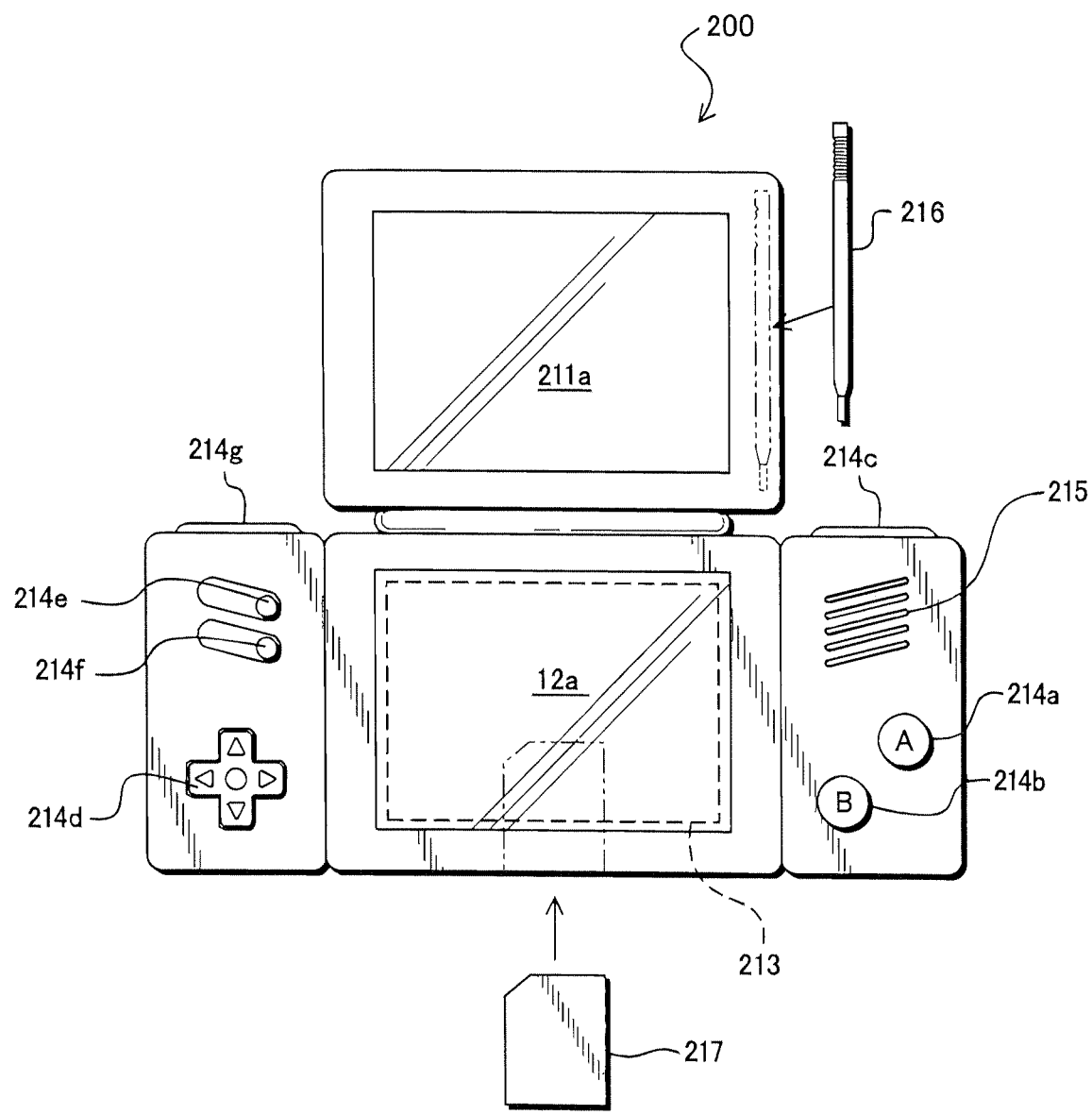

RIVET MECHANISMS

CROSS REFERENCE TO RELATED APPLICATION

This application claims priority to U.S. Application 61/354,494, filed Jun. 14, 2010, the entire contents of which is incorporated herein by reference.

TECHNICAL FIELD

The technology herein relates to a method and apparatus for modifying the game space associated with a video game displayed on a display screen by entering various structural elements in the displayed game space. In more detail, the technology herein relates to techniques for incorporating basic structural elements, such as girders, conveyor belts and ladders in the game space environment while playing the game, so that the player can continuously change the playing environment for increased enjoyment.

BACKGROUND AND SUMMARY

A popular genre of computer games is the one where a player character controlled by the user moves within a game environment, continuously interacting with the structural elements disposed in the environment, e.g., bridges, rivers, hills, etc. In addition, the player character may be involved in a fight with an enemy character, trying to avoid being hit by projectiles thrown by the enemy character, or attempting to escape to a safe location away from the enemy character.

For example, one of the most famous fictional characters in video games, Mario, created by Nintendo, has appeared in over 200 video games since his creation. Mario originally appeared in platform games, starting with Donkey Kong, but currently appears in various video games genres, such as racing, puzzles, role-playing, fighting and sports. In most of these games, Mario is shown navigating through a game environment, constantly avoiding enemies, e.g., Donkey Kong, while climbing hills, jumping from buildings, or running through the busy streets of New York.

Even though the user enjoys the continuously changing game environment as the player character moves in the game space, the user is limited in his/her options in negotiating the various features of the game terrain the player character is currently traversing. For example, if the player character needs to go from a point A to a point B, the player character has to use the terrain features that are available, for example, a bridge, or a certain road. Moreover, if there is no available pathway to get to point B, the player character will have to follow a detour in the game space, which may cause loss in elapsed travel time resulting in reduced game score or even cause infliction of damage by the player character's enemy.

Thus, it would be beneficial to provide the user with means to modify the game environment by inserting various structural elements that can be used by the player character to achieve his/her goal, e.g., get to a certain point quicker, avoid a thrown projectile, or hide from the enemy. The insertion of the structural elements should be possible in real time in direct response to the path undertaken by the player character and in response to the interaction of the player character with all other elements and game characters in the game environment.

In one exemplary illustrative non-limiting implementation, the user modifies the displayed game space environment by selecting a block element on the display screen by using an input device, e.g., a stylus. Subsequently, the user drags the input device from the location of the first block element towards the location of a second block element of the same type. After release of the input device from the display screen by the user, a structural element corresponding to the type of the first and second block elements is formed between the first and second block elements. This structural element becomes part of the game environment and the user can incorporate it in his/her game.

In yet another exemplary illustrative non-limiting implementation, different types of structural elements inserted by the user may be combined within a specific game environment, as they interact with various player characters, to provide a variety in the scope of the game.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 17I is an external view of a portable game machine according to a further illustrative embodiment of the present invention;

DETAILED DESCRIPTION

According to an exemplary embodiment, the user who plays a video game, constructs various structures in the game space for the purpose of guiding a player character controlled by the user to reach a desired point in the game space. For example, this may involve erecting a girder that connects two points in the game space. Or, the user may draw a ladder connecting two points that the player character climbs to get to the end point of the ladder. Moreover, the user may draw a conveyor belt connecting two points such that when the player character gets on the belt he/she is automatically moved towards the end point of the conveyor belt.

A user is able to construct the various structures by placing rivets in desired points in the game space. Placing rivets in the game allows users to draw girders, ladders and conveyor belts from one rivet to another. This way, the user enjoys feeling of building up and continuously changing the game environment while playing the game.

Within the game, there are three different colored blocks (red, purple and blue) called "rivet blocks". Each block is 16×16 pixels in size. At the center of each block is a shiny metallic round rivet head, which looks like the head of a standard screw, and is meant to imply the feeling that the rivet blocks provide a mechanical building of a structure.

Figure 1:
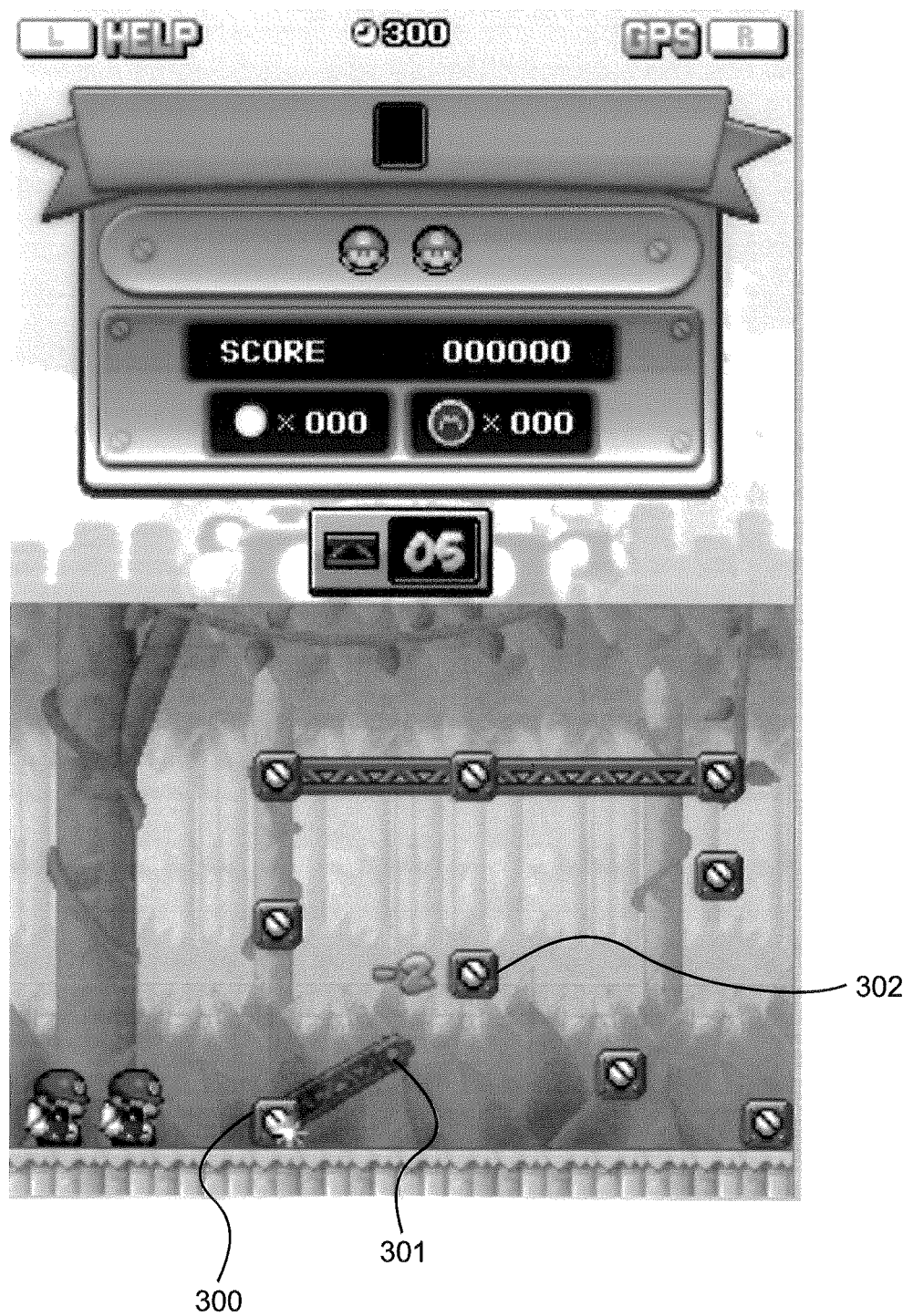
FIGS. 1-3 show operation of red rivet mechanisms for building girders in the game space.
Figure 2:
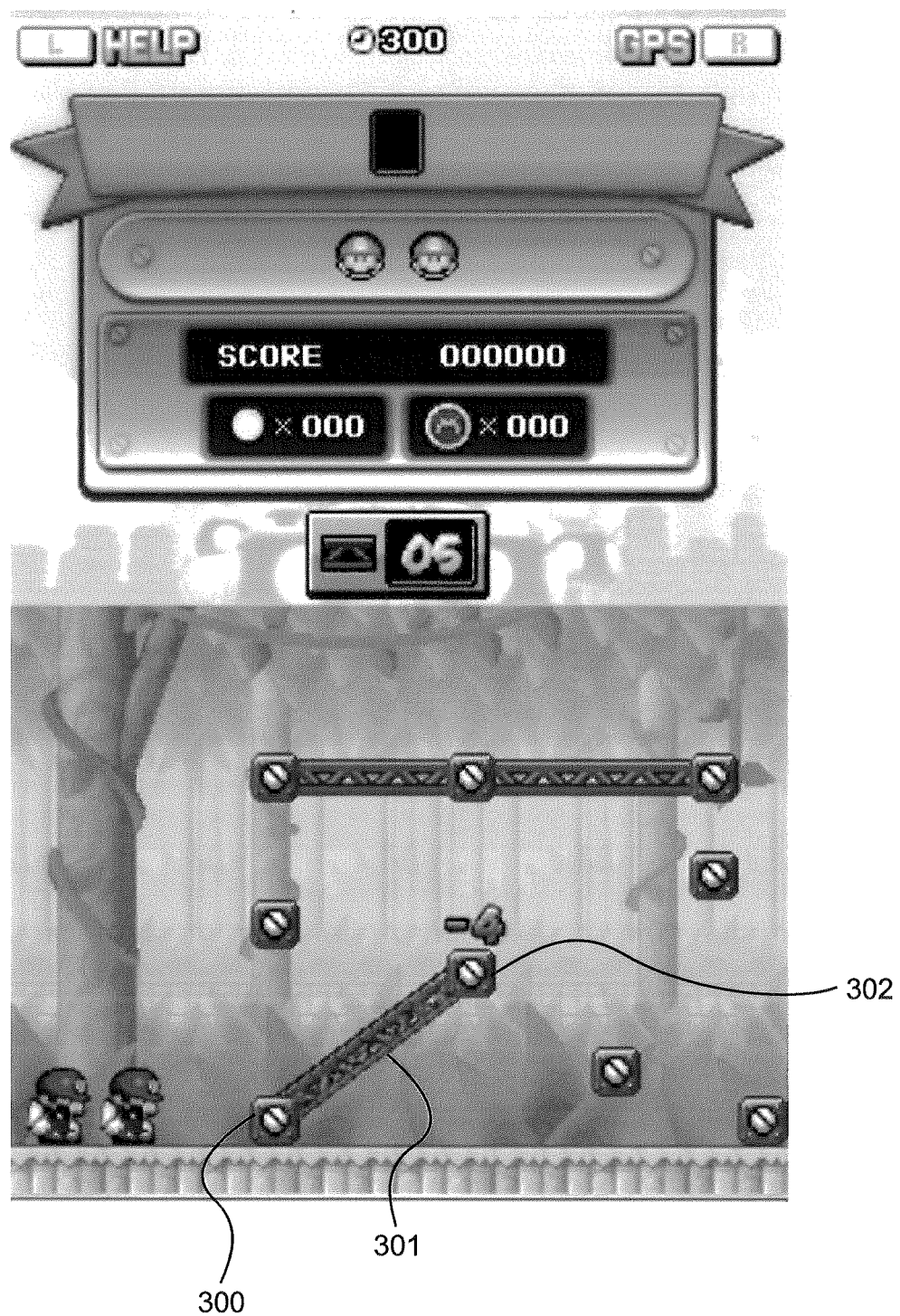

In one exemplary non-limiting embodiment, red rivet blocks are used to build girders. As can be seen in FIG. 1, nine red rivet blocks are located in the game space. When the user touches a red rivet block 300 and drags away from it, a red girder 301 is "pulled" out of the rivet block 300 (FIG. 1). When the player attaches the end of this girder 301 to a second red rivet block 302 and releases the stylus, the girder locks into space, spanning between the two connected red rivet blocks 300 and 302, and creates a solid surface interconnecting the two red rivet blocks 300 and 302 (FIG. 2). This solid surface becomes part of the game environment with which the characters 303 can interact, for example, walk on it as they move from one point to a second point in the game space (FIG. 3).

Figure 3:
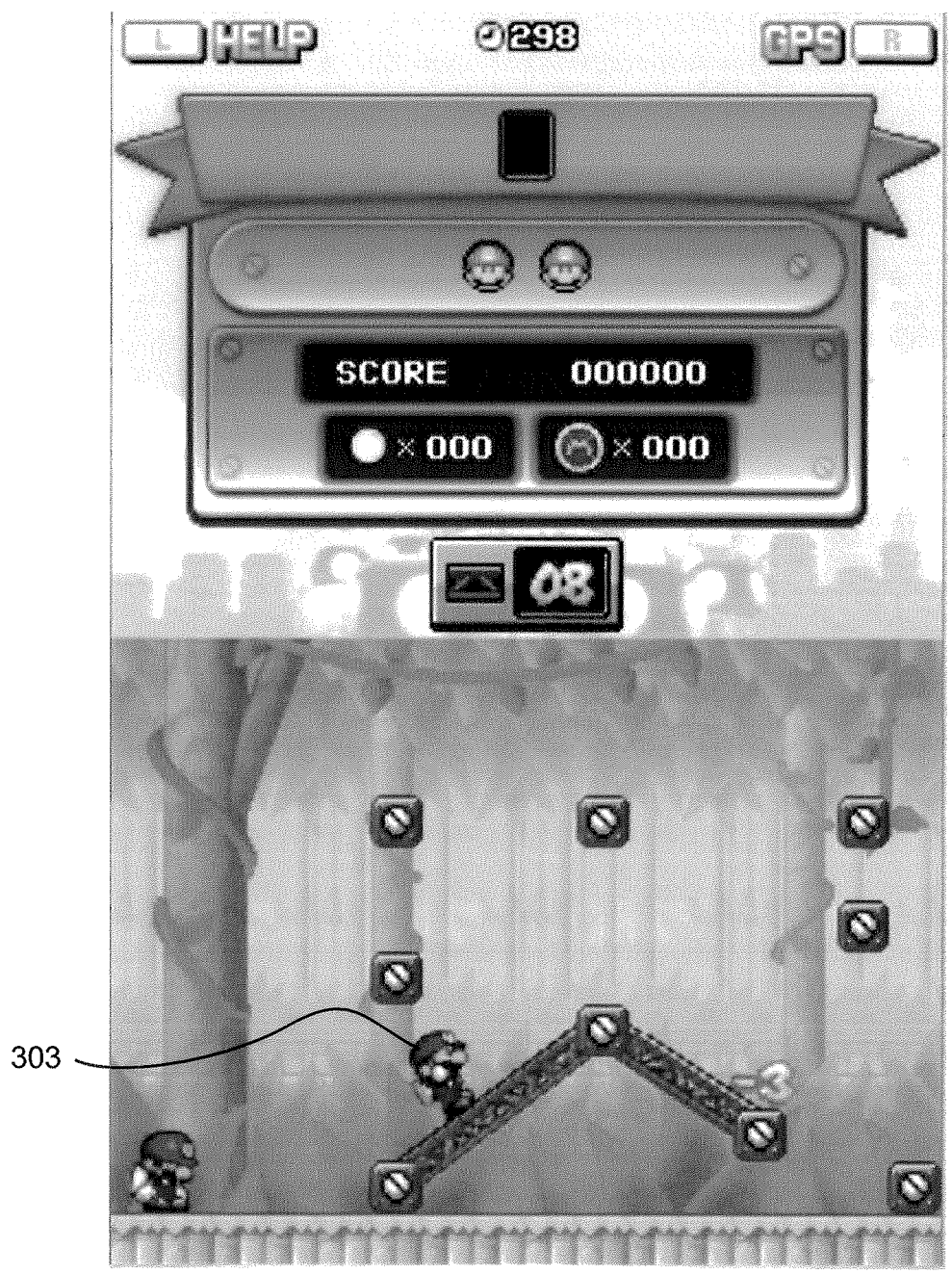

The user is able to extend (by dragging) a girder from a specific red colored block to another red colored block in any direction (see FIG. 3). Moreover, the player can extend the girder along any desired distance connecting two red colored blocks.

Figure 4:
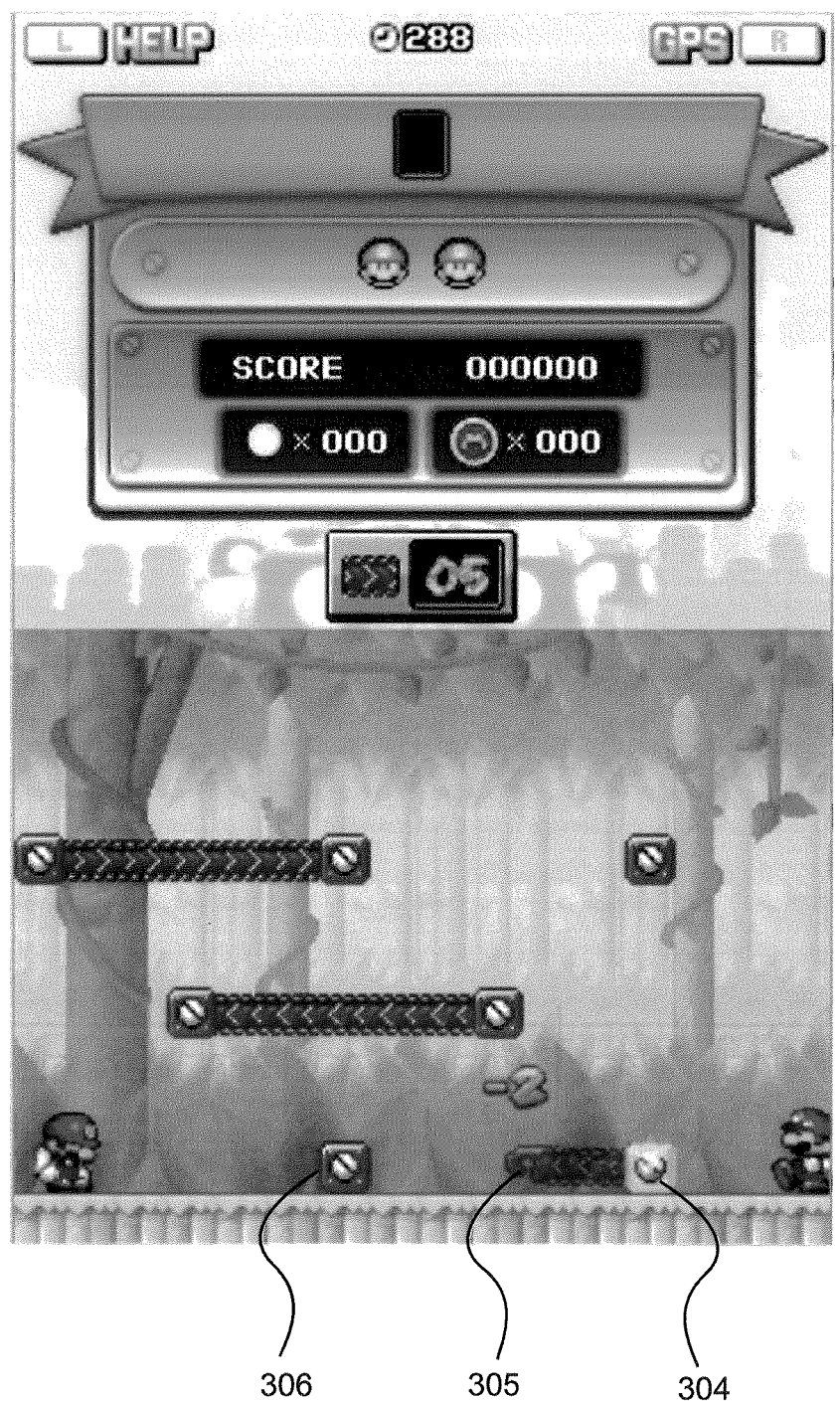
FIGS. 4-8 show operation of purple rivet mechanisms for building conveyor belts in the game space.
Figure 5:
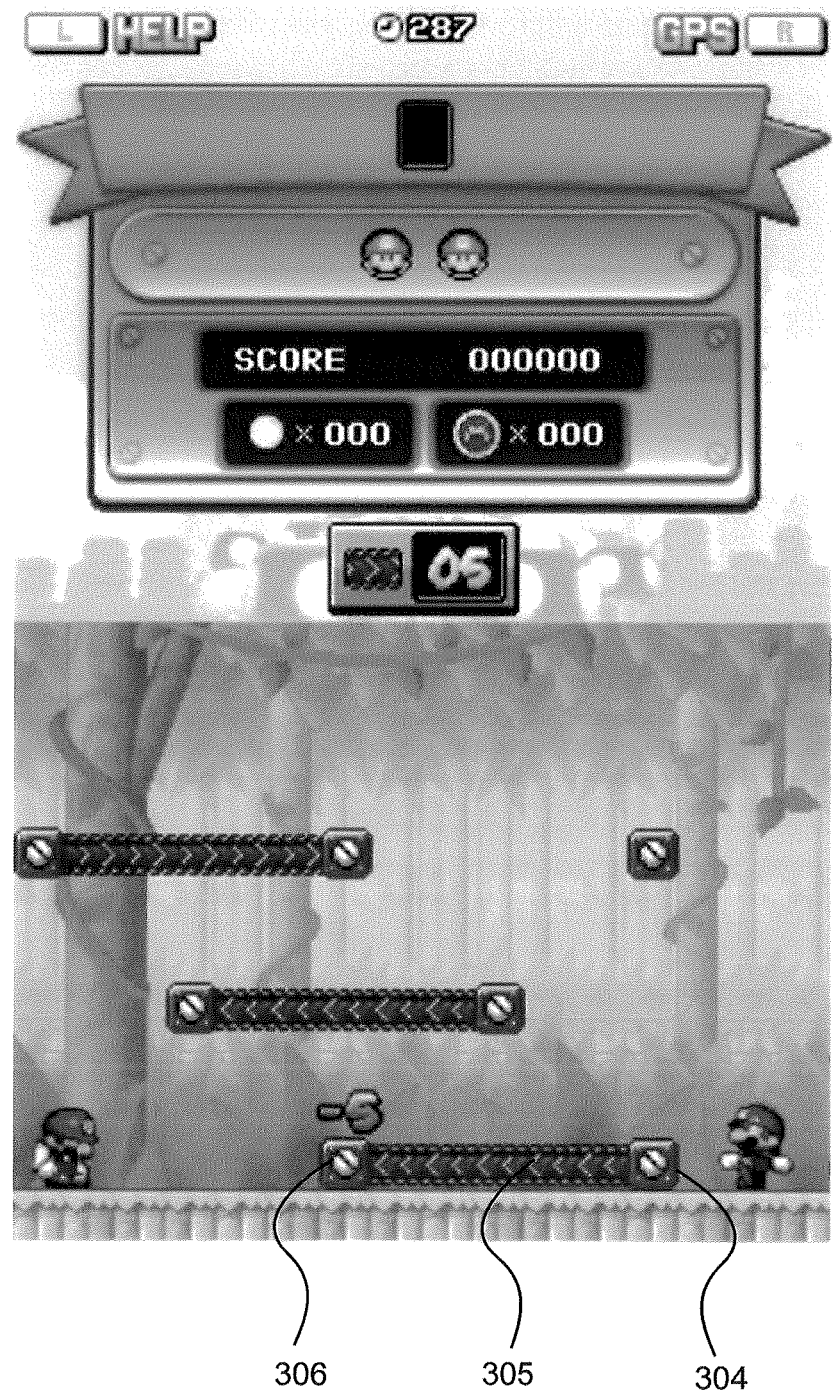

In another exemplary non-limiting embodiment, purple rivet blocks are used to build conveyor belts. FIG. 4 shows seven purple rivet blocks located in various spots in the game space. When the user touches a purple rivet block 304 and drags away from it, a purple conveyor belt 305 is "pulled" out of the rivet block 304 (FIG. 4). When the player attaches the end of this conveyor belt 305 to a second purple rivet block 306 and releases the stylus, the conveyor belt locks into space, spanning between the two connected purple rivet blocks 304 and 306, and creates a solid moving surface 305 interconnecting the two purple rivet blocks 304 and 306 (FIG. 5).

Figure 6:
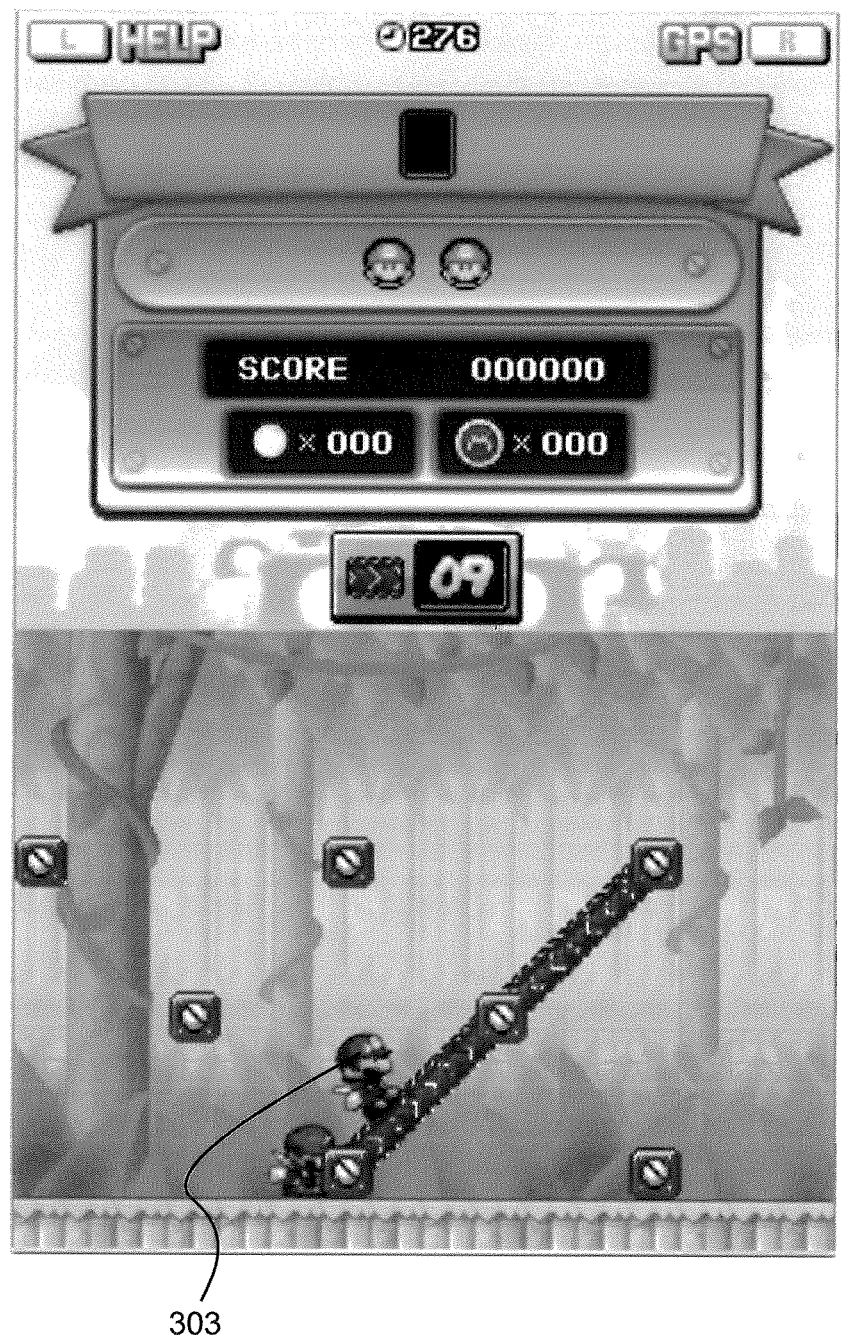
Figure 7:
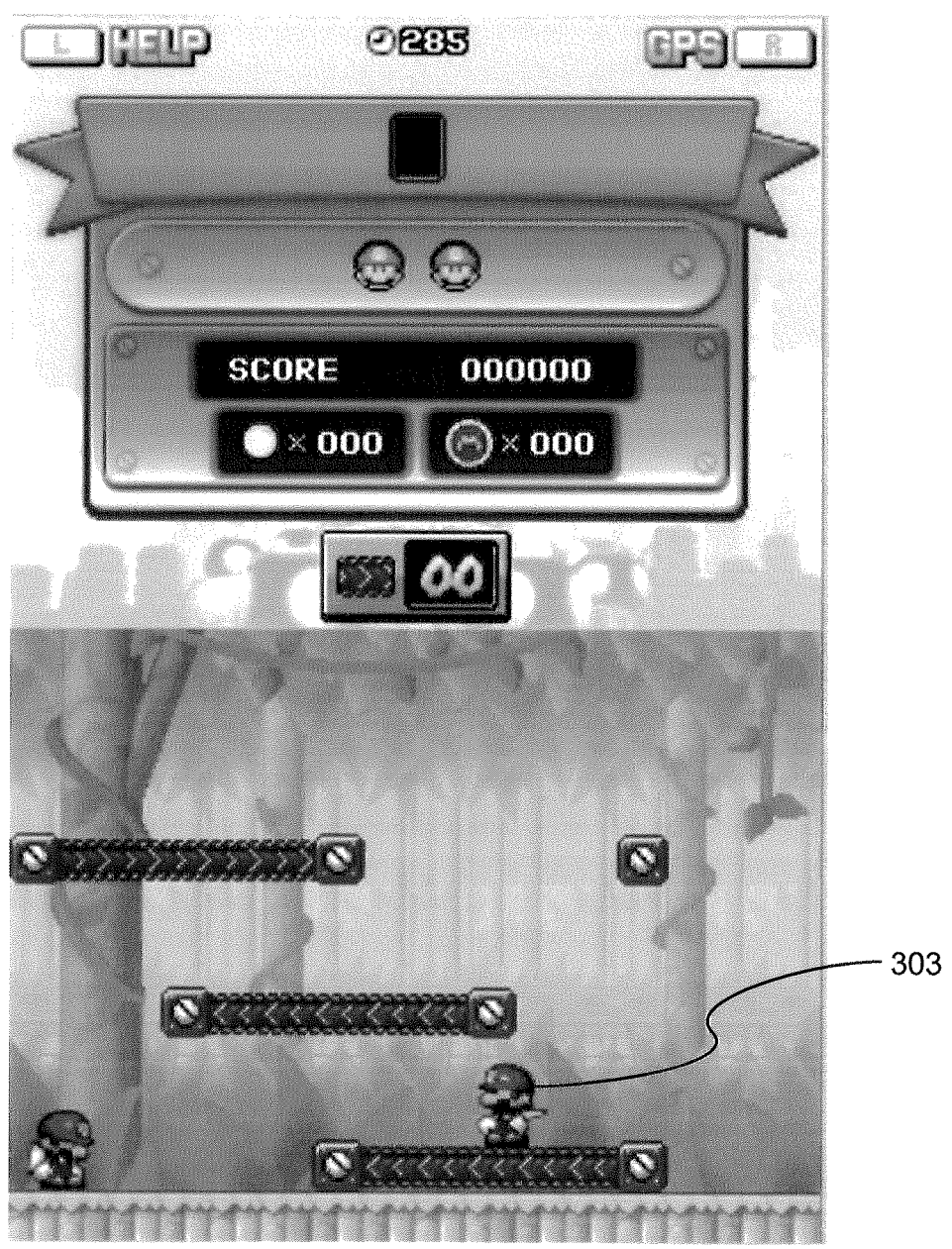
Figure 8:
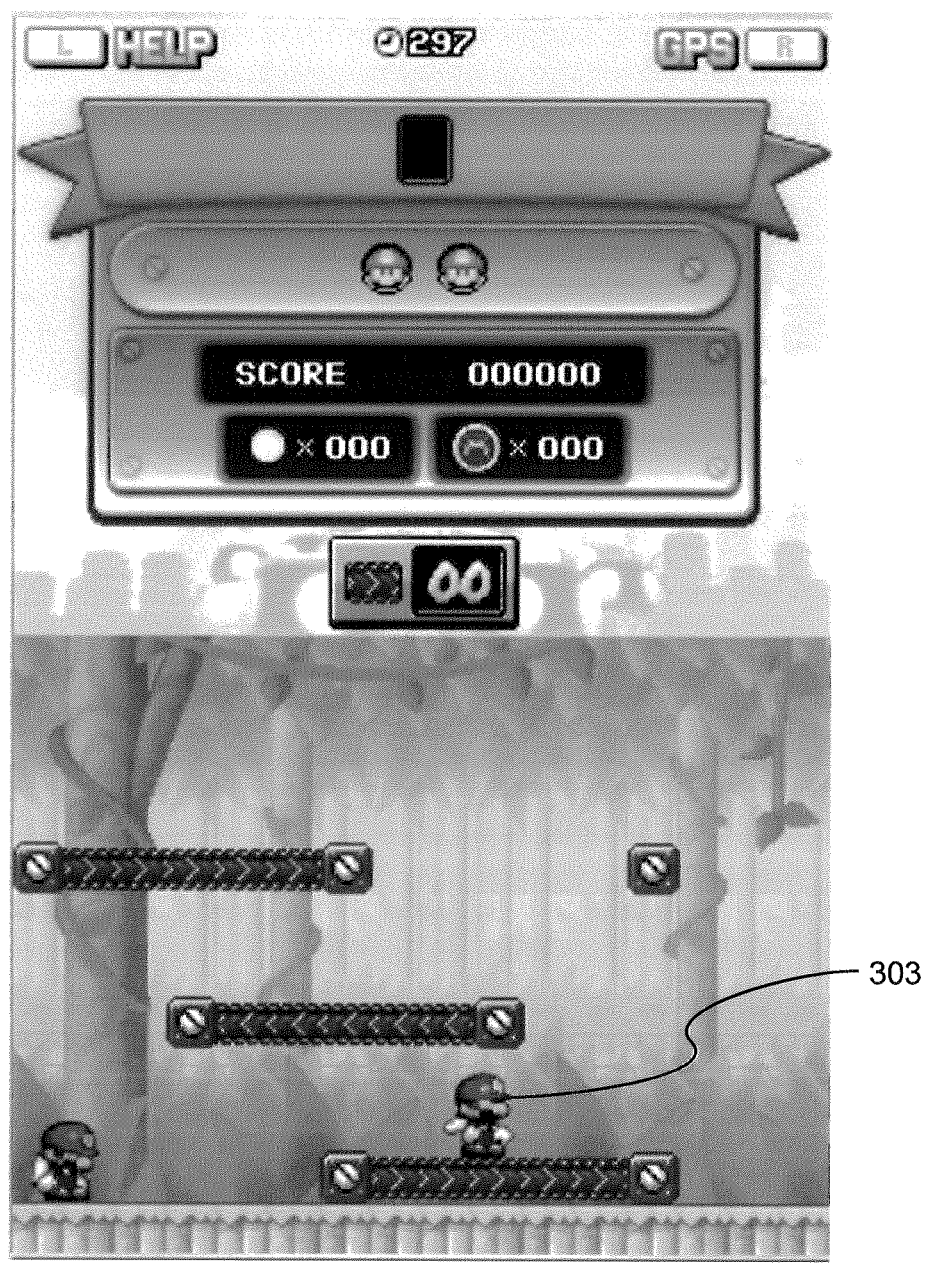

Conveyor belts are used to transport game characters 303 automatically from one place to another, and appear as moving belts with arrows to show the user which direction they are travelling (FIG. 6). The player character 303 can only move along the direction indicated by the arrows while on the conveyor belt (FIGS. 7, 8).

The stylus drag direction that is used to connect two purple rivets defines the direction in which the purple conveyor belt will travel on start. In other words, if the drag direction to connect two purple rivets was from left to right, then the constructed purple conveyor belt will be rotating/moving towards the right.

Figure 9:
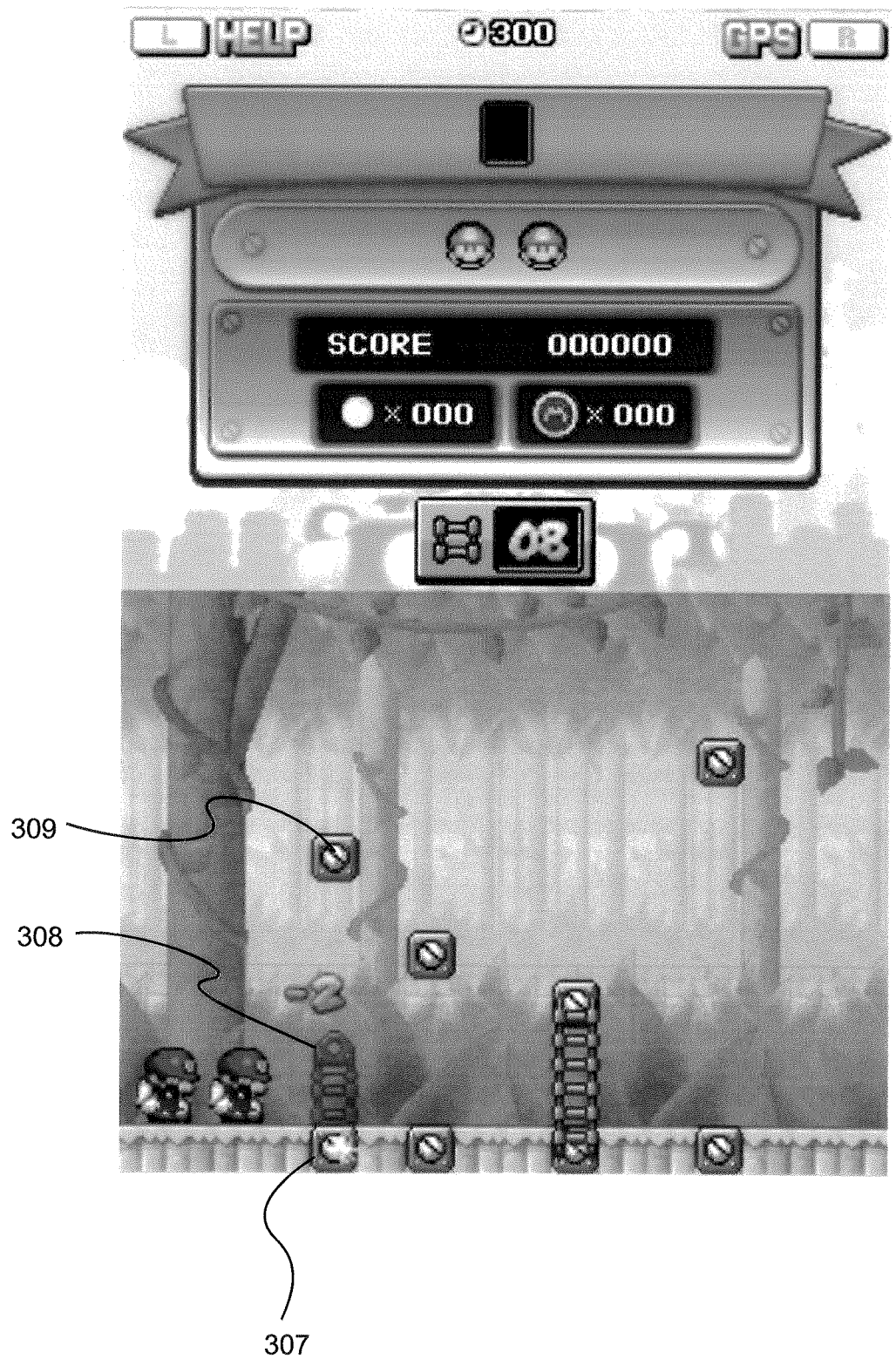
FIGS. 9-12 show operation of blue rivet mechanisms for building ladders in the game space.
Figure 10:
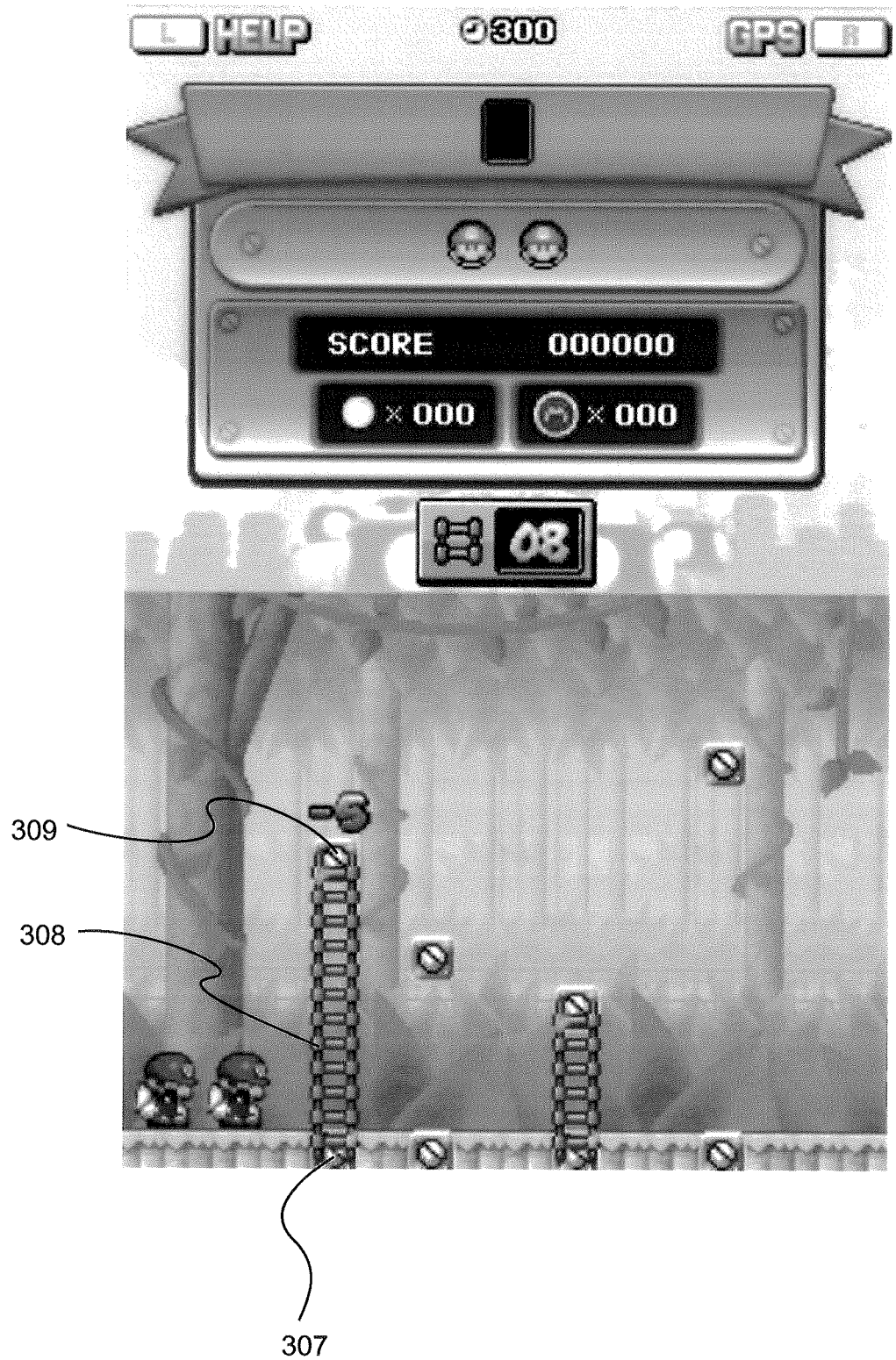
Figure 11:
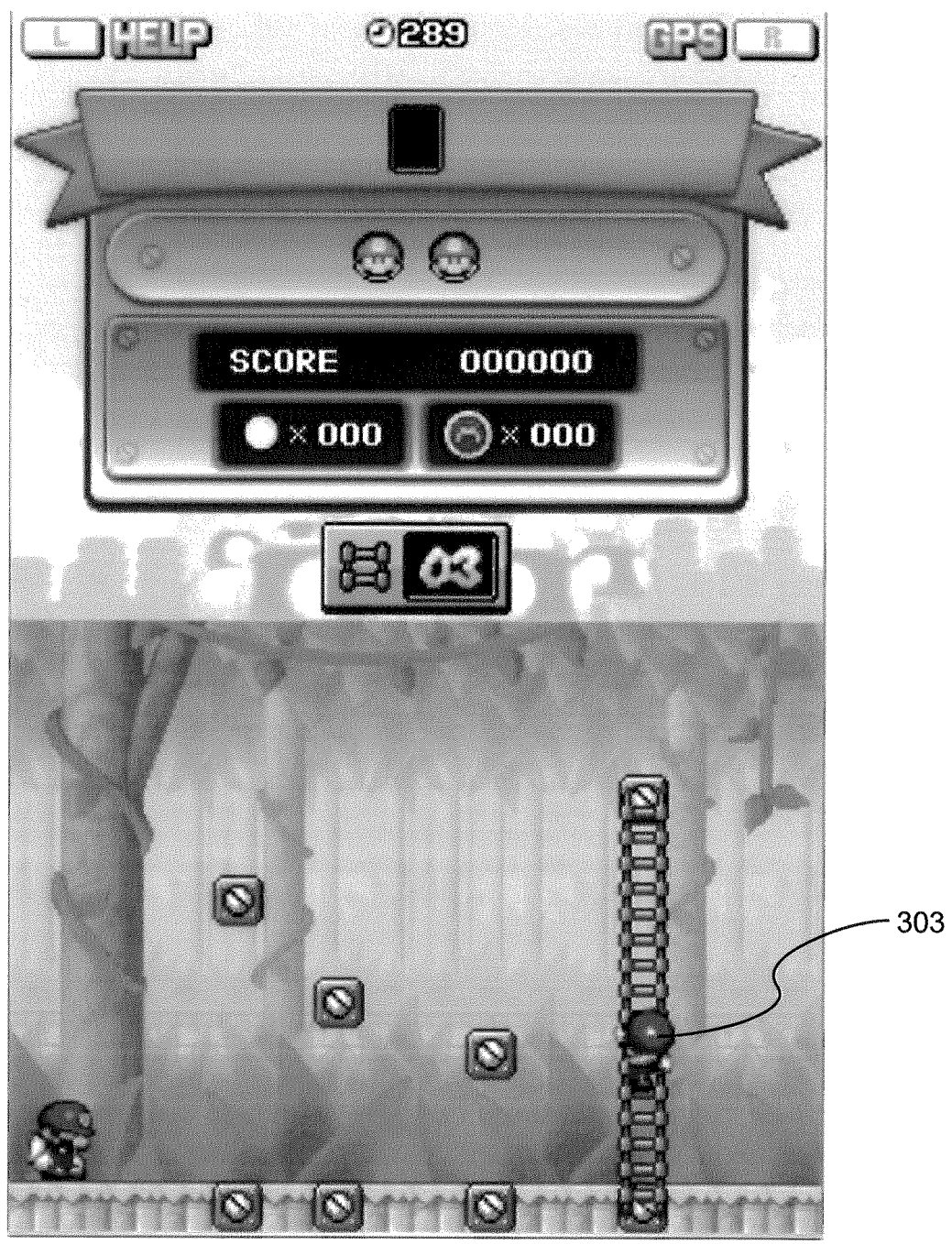

In yet another exemplary non-limiting embodiment, blue rivet blocks are used to build ladders. When the user touches a first blue rivet block 307 and drags away from it upward or downward, a blue ladder 308 is pulled out of the rivet block 307 (FIG. 9). When the player attaches the end of this ladder 308 to a second blue rivet block 309 and releases the stylus, the ladder locks into place and creates a ladder 309 (FIG. 10) for which the characters 303 in the game can climb up or down depending on whether the second blue rivet block is above or below the first blue rivet block (FIG. 11).

Figure 12:
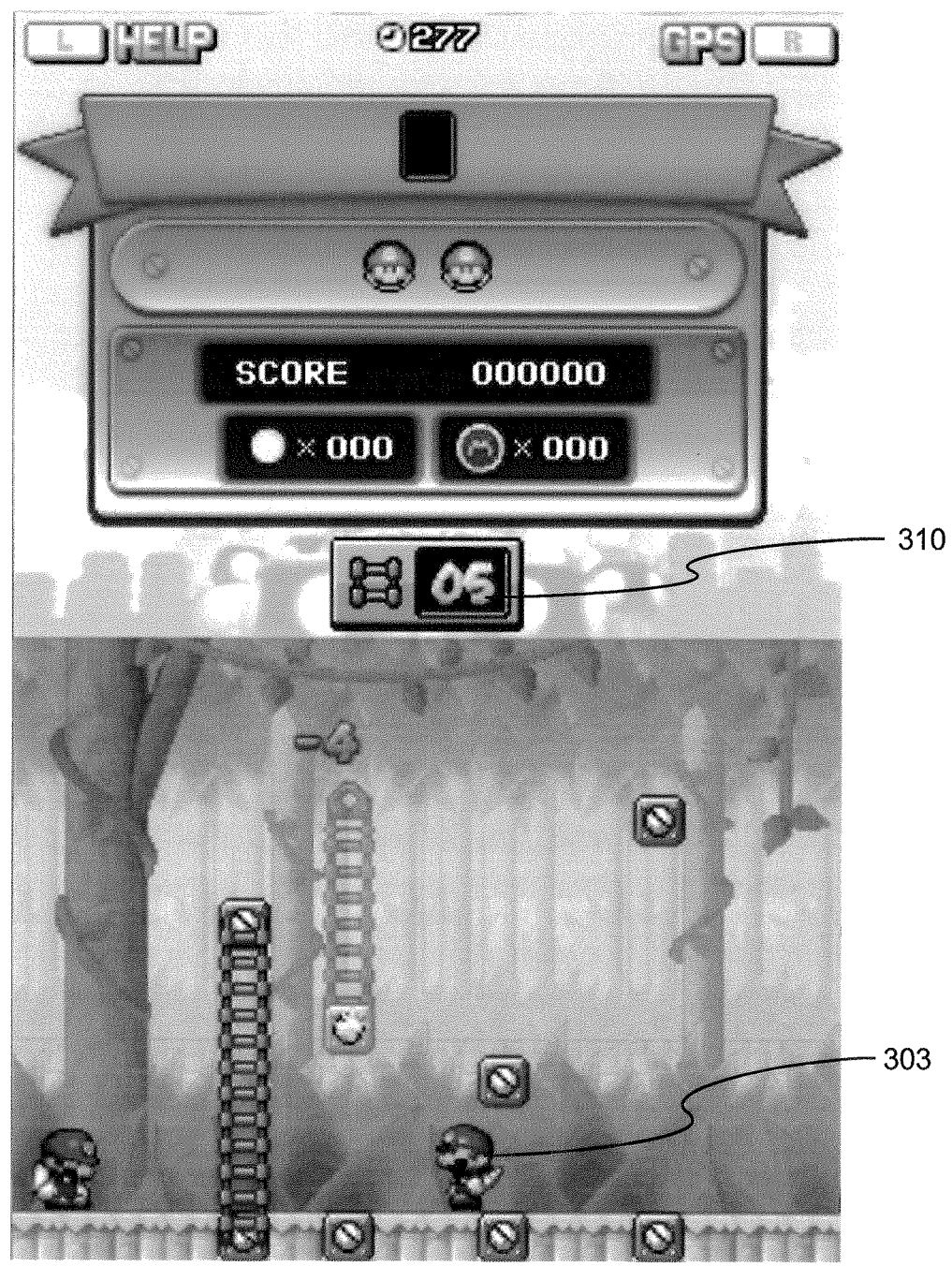

A ladder cannot be created when connected to only one blue rivet (FIG. 12).

In all the above mentioned embodiments, each rivet block flashes when not in use to draw attention to the user as interactive objects within the game. During interaction (e.g., building a girder, a conveyor belt or a ladder) the rivet blocks scale up and down and the rivet heads are shown rotating clockwise and counterclockwise to convey the feeling that they are being tightened and untightened.

Moreover, in all the above embodiments, scoring is kept while the various structures are created to indicate the amount of existing building blocks (e.g., ladder rungs). For example, score 310 is shown near the second rivet block when the structure (e.g., a girder, conveyor belt or ladder) has been extended to the second rivet block from a first rivet block and the structure has become solid (see FIG. 12).

Figure 13:
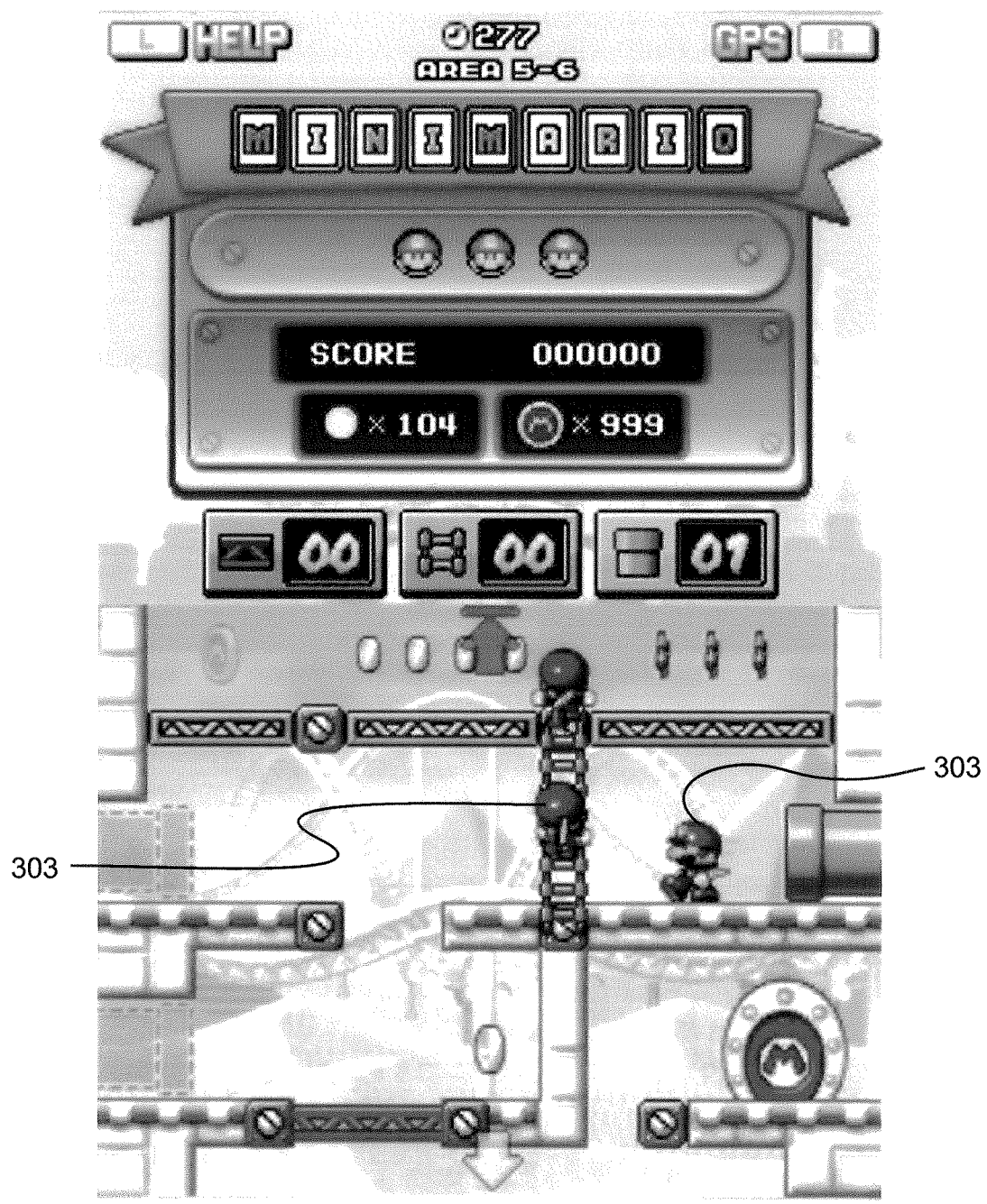
FIGS. 13-16 show an exemplary game environment using rivet mechanisms.
Figure 14:
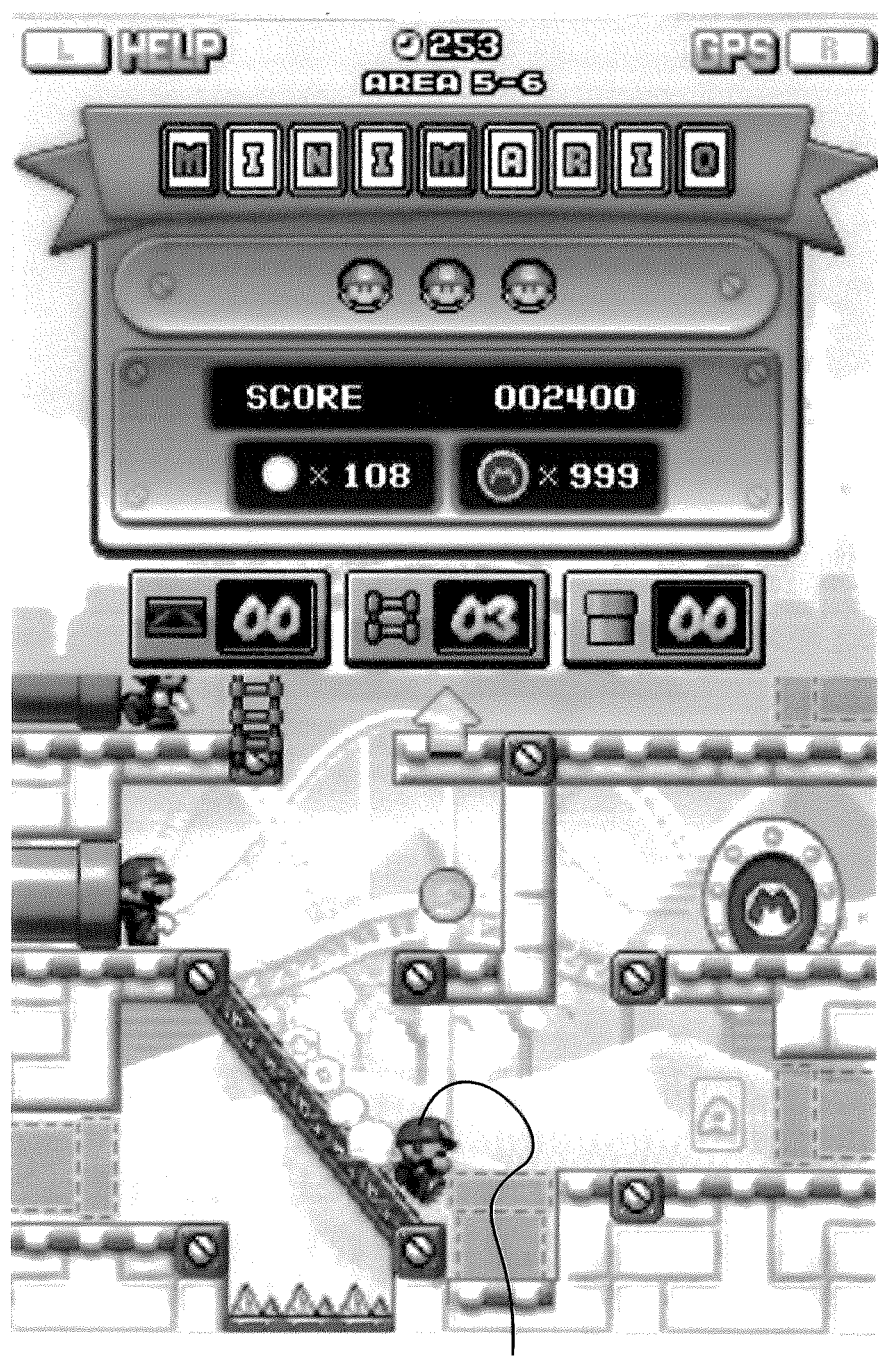

The above features can be used in combination in a game environment. For example, as can be seen in FIGS. 13-14, girders 301 and ladders 308 are built so that the player character can navigate through the game space, overcoming obstacles, or taking shortcuts, thus providing excitement and variety in the game.

Figure 15:
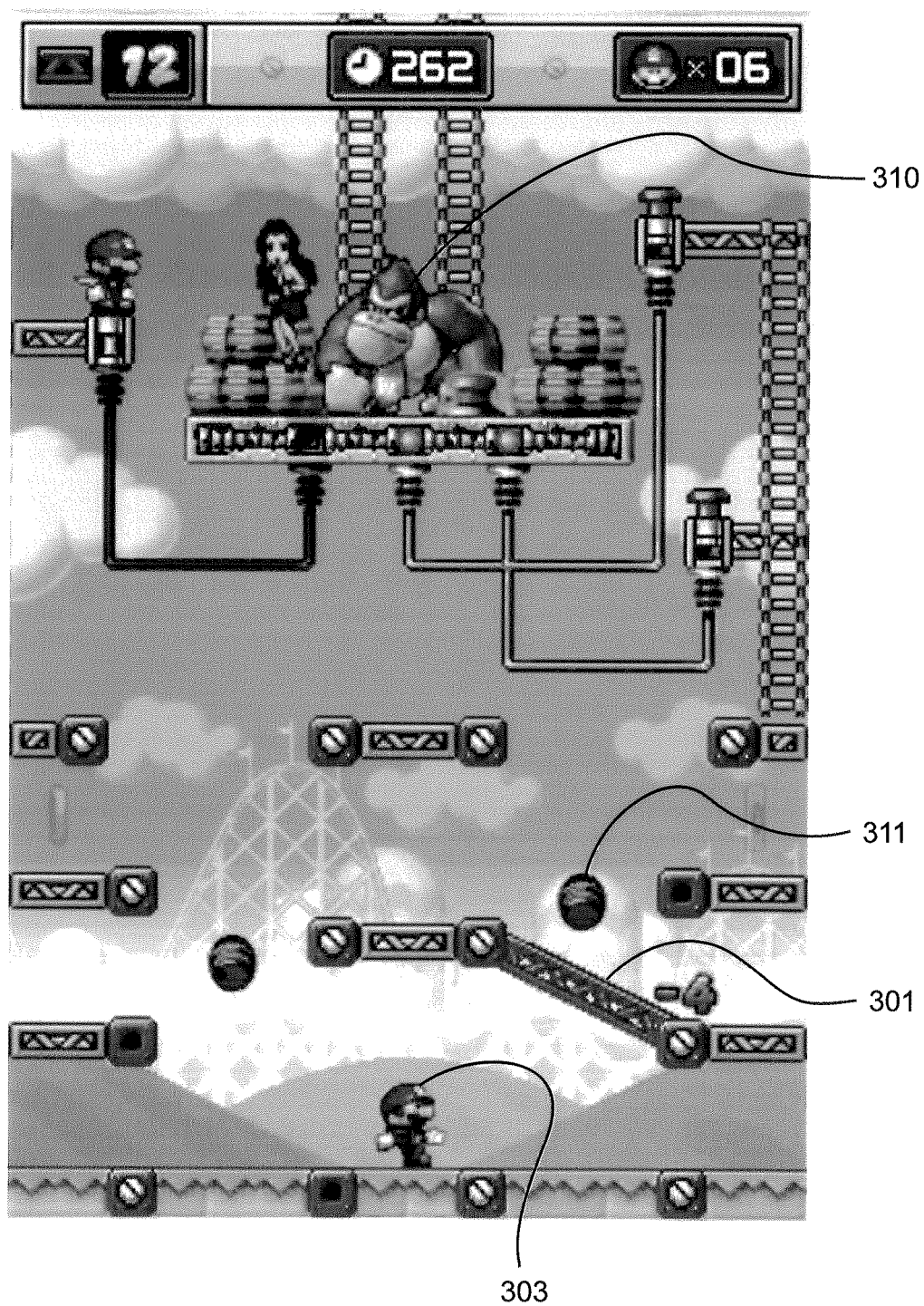
Figure 16:
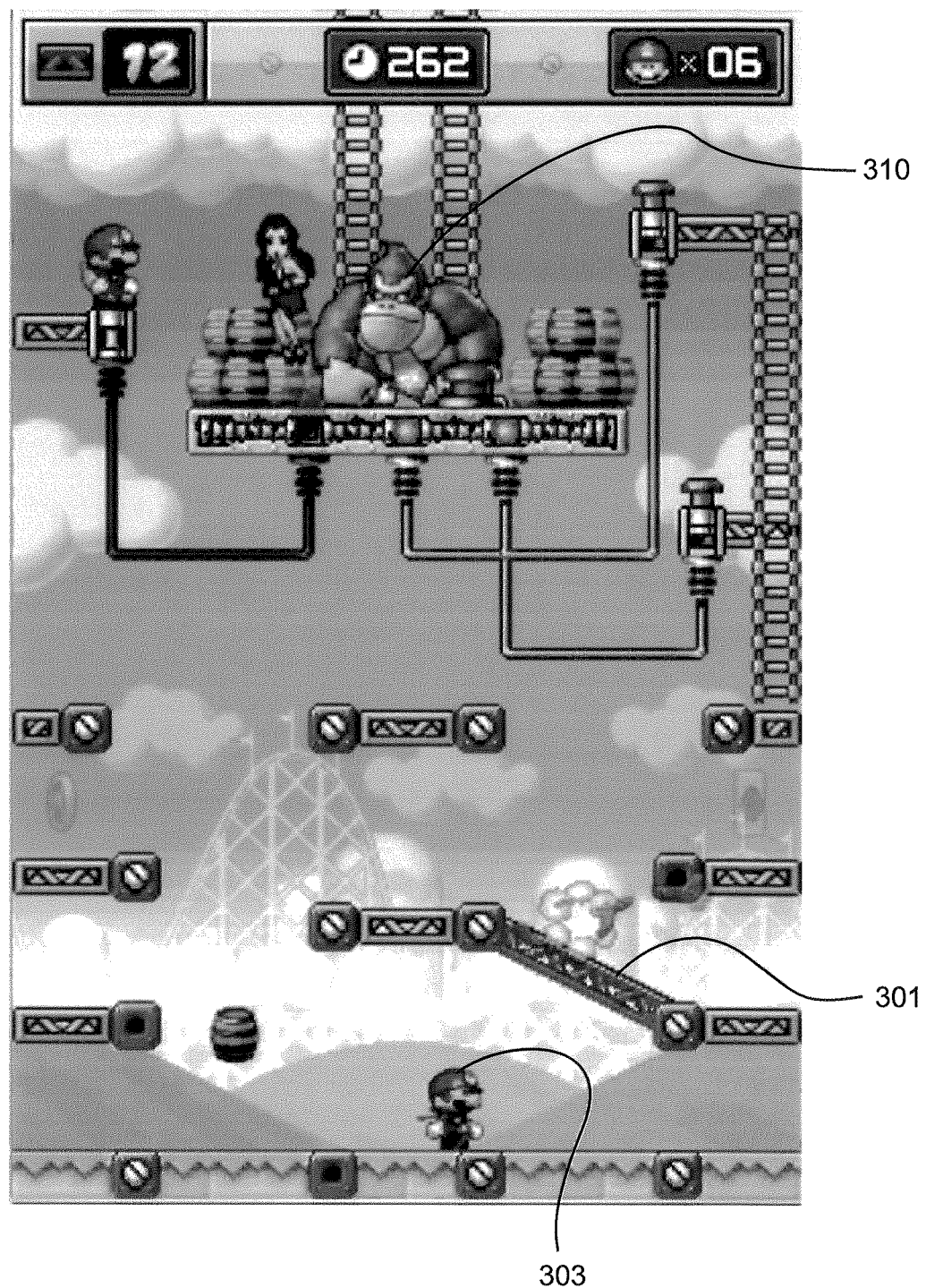

In another example of the use of the rivet mechanisms in a game environment, FIGS. 15-16 show an environment which includes interaction between a player character 303 and an enemy character (e.g., Donkey Kong) 310. During play, the user can build girders 301 which become part of the environment and, for example, serve as protectors of the player character 303 by smashing objects 311 (e.g., barrels) thrown by the enemy character 310 that come into contact with the girders (FIG. 16).

Figure 18B:
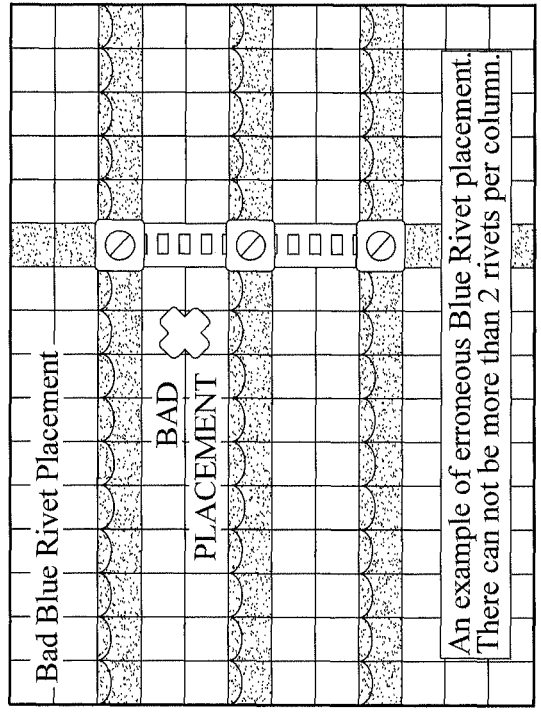
FIGS. 18A-18B show limitations for blue rivet placement.
Figure 18A:
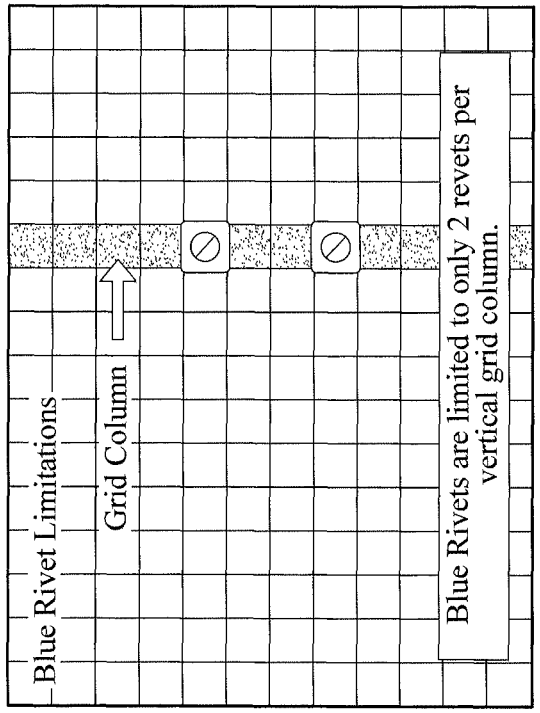

Although red and purple rivets can be placed anywhere, blue rivets (producing ladders) have some restrictions. Blue rivets are limited to a count of two within a single grid column. This restriction comes about due to the behavior of player characters which use the ladders. If a player character were to come across a point where two ladders connect to make one big ladder (see FIG. 18B), the player character would not know which direction to climb (up or down). In contrast, if there is only one ladder within a single grid column (see FIG. 18A), the player character can climb up or down on that single ladder.

Example Game System

Figure 17A:
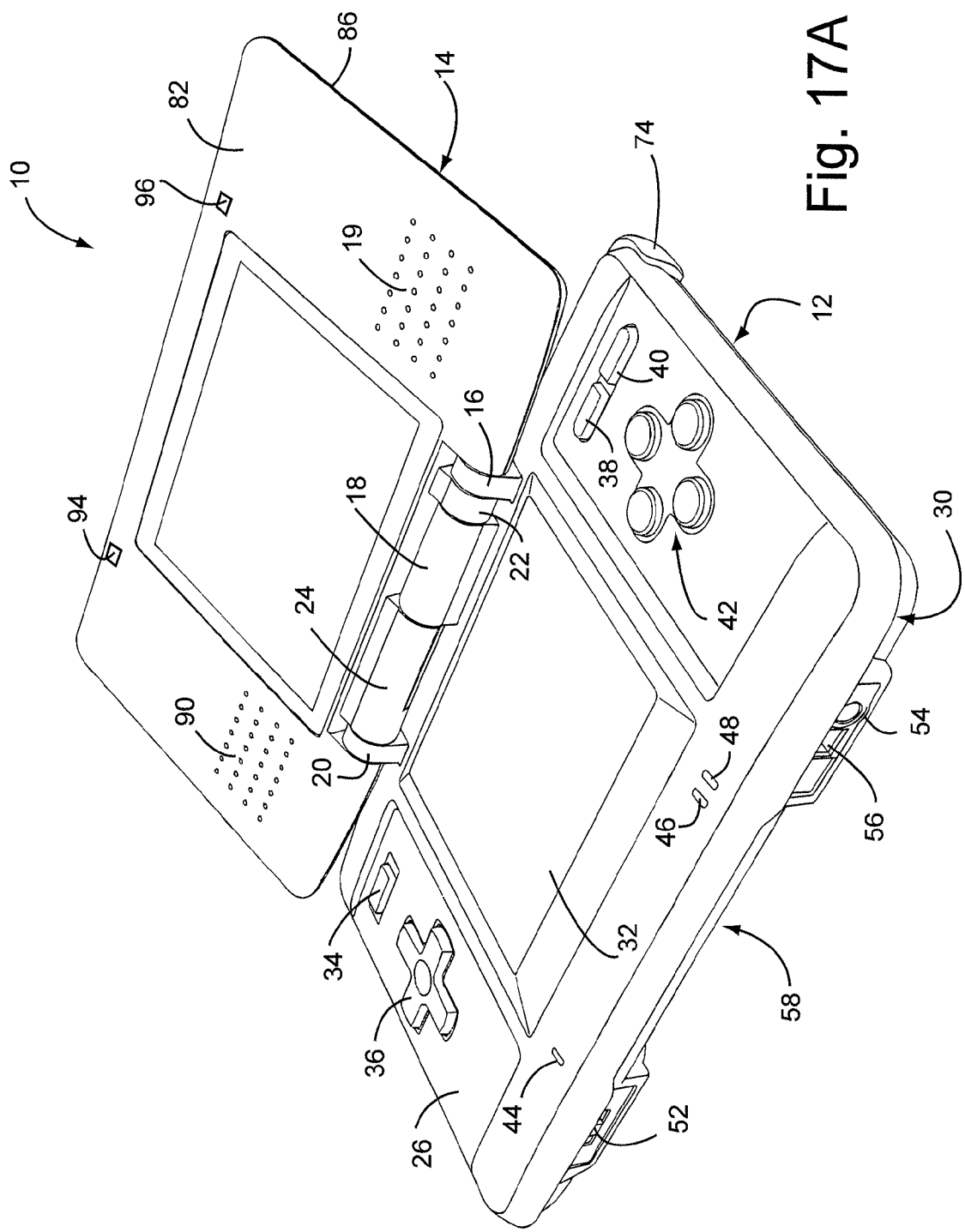
FIG. 17A is a perspective view of the electronic game and communications device in accordance with an exemplary embodiment of the invention, with the device shown in an open, ready-to-use orientation.
Figure 17B:
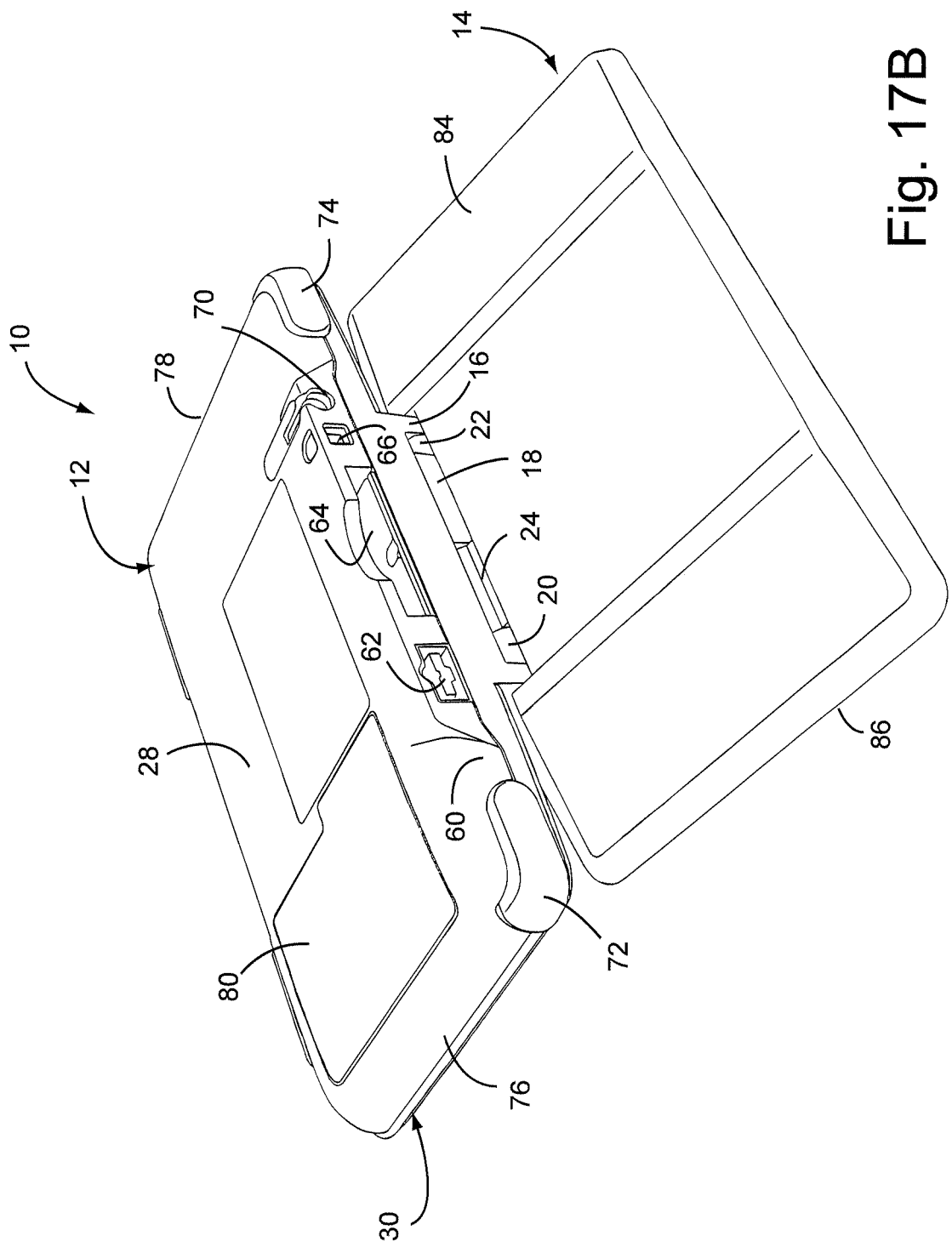
FIG. 17B is a inverted perspective view of the game device shown in FIG. 1.

Referring to FIGS. 17A and 17B, in an illustrative embodiment the game device or console 10, which can be used as a platform for using the rivet mechanisms disclosed herein, includes a main body 12 and a cover body 14 hingedly connected to each other along an upper edge of the main body 12 and a lower edge of the cover body 14 (references herein to terms such as "upper" and "lower" and "forward" and "rearward" are for ease of understanding and are made relative to an orientation of the game device where the cover body 14 is in an open position and the game is being held by a user in a normal operating position). Hinge elements 16, 18 and 20 on the main body 12 mesh with hinge elements 22 and 24 on the cover body, with a hinge pin (not shown) extending through the aligned hinge elements in conventional fashion. Note that because hinge elements 16, 18 and 20 extend from the upper (or inner) face 26 of the main body 12, the cover body 14 overlies the upper face 26 when the cover body 14 is closed over the main body. When the cover body 14 is in its fully open position, it is substantially parallel to the main body 12 but lies in a substantially parallel, offset plane. The main body 12 also has a lower (or outer) face 28 (FIG. 17B) and a peripheral edge 30.

A first display screen 32 is recessed within the upper face 26 of the main body 12 with dimensions of approximately 2½ inches in length and 1⅞ inches in width, yielding a diagonal screen dimension of 3 inches. The screen in the exemplary embodiment is a backlit, color liquid crystal display (LCD). This screen is touch sensitive and may be activated by a stylus, described further herein. A power button 34 is located in the upper left corner of face 26 and is used to turn the game on and off. A cross-shaped directional control button 36 is located adjacent and below the power button 34, and is used for game play control.

In the upper right corner of the main body 12, there are side-by-side "start" and "select" buttons 38, 40, respectively, with X/Y/A/B buttons 42 located adjacent and below the "start" and select" buttons. Buttons 38, 40 and 42 are also used for game play control. A microphone 44 is located below the left edge of screen 32 for use with specially designed games having a microphone feature. A battery recharge indicator LED 46 and a power indicator LED 48 are also located on the upper face 26, adjacent the lower edge thereof, below the right edge of screen 32.

Figure 17C:
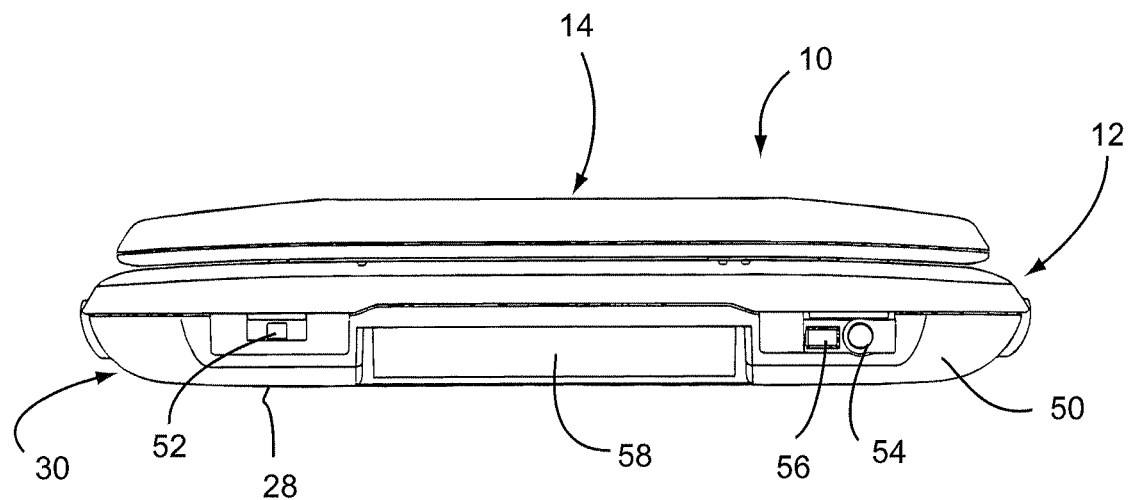
FIG. 17C is a front elevation of the device shown in FIG. 17A, but with the game shown in a closed position.
Figure 17D:
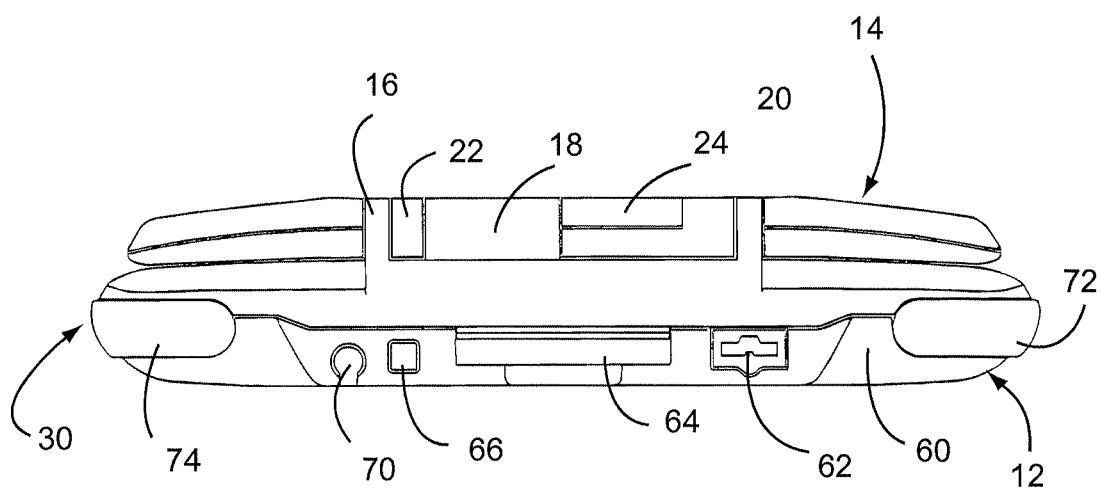
FIG. 17D is a rear elevation of the device shown in FIG. 3.

With reference now especially to FIG. 17C, a lower or forward portion 50 of the peripheral edge 30 (closest to the user) is provided with a volume control slide 52 and headphone and microphone connectors 54, 56 on either side of a first game slot 58. Slot 58 is especially designed for larger game cartridges or cards originally designed for use with the Game Boy Advance® game system.

Figure 17E:
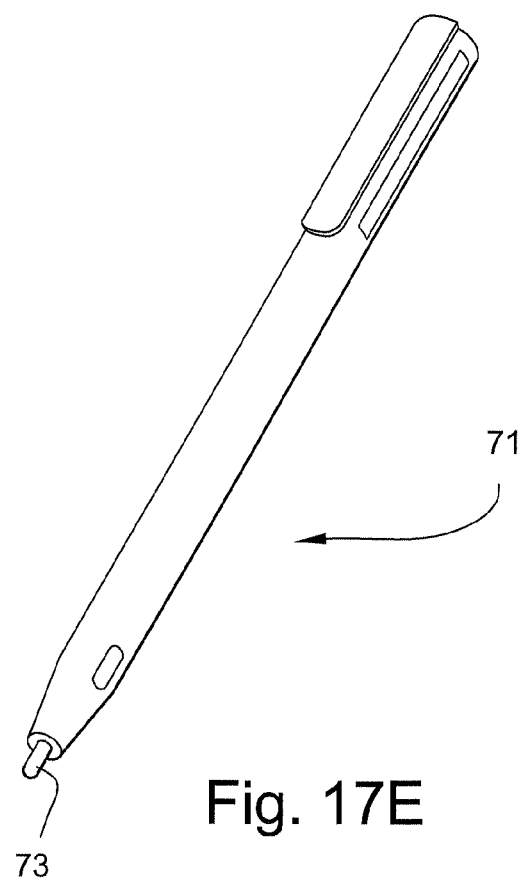
FIG. 17E is a perspective view of a stylus for use with the game device shown in FIGS. 1-4.

As best seen in FIG. 17B, an upper or rearward portion 60 of the peripheral edge 30 is provided with an external extension connector 62 that permits connection to an AC adapter for recharging the internal battery (not shown), or for operating the game using household power. A second game slot 64 in edge portion 60 is designed for receiving memory or game cards especially designed for this game device. The second game slot 64 is smaller than the first game slot 58, reflecting the different sizes of the game cards. Openings 66, 68 form an elbow-shaped through slot adapted for securing a wrist strap (not shown), thereby enabling the user to secure the game device to the body and thus minimize the potential for losing or misplacing the game. A stylus port or holder, in the form of a blind bore 70 is located adjacent the wrist-strap mount for holding a stylus 71 (FIG. 17E) before or after use.

The stylus 71 is a plastic pencil-shaped device with a rounded tip 73 and is used to activate the touch screen 32.

A pair of left, right control buttons (or shoulder buttons) 72, 74 are located on the peripheral edge 30, at the corners where the upper portion 60 of the peripheral edge 30 meets the side portions 76, 78 of the peripheral edge. The location of these buttons and the location of previously described buttons 34, 36 and 42 facilitate manipulation game control by the user's thumbs and index fingers when the game is held with two hands in a natural and intuitive manner.

The lower (or outer) face 28 of the main body is provided with a battery cover 80 (FIG. 17B) for accessing a rechargeable battery pack located within the main body.

The cover body 14 also has an upper (or inner) face 82 (FIG. 17A) and a lower (or outer) face 84 (FIG. 17B) connected by a peripheral edge 86. The upper face 60 incorporates a second display screen 88 of substantially the same dimensions as screen 32. Screen 88 is also a backlit color LCD. The cover body 14 also incorporates a pair of stereo speakers, with speaker grills 90, 92 located on opposite sides of the screen 88. Dimples or pads 94, 96 may be located above and laterally of screen 88. The dimples may be made of a compressible polymer or other suitable material and serve to dampen engagement of the inner surface 82 of the cover body 14 with the inner surface 26 of the main body 12 when the cover body is closed over the main body.

As already noted, the game card slot 58 is sized and adapted to receive a conventional game card designed for the by the Nintendo Gameboy Advance System®. Accordingly, the game card per se for slot 58 does not form any part of this invention and need not be described further.

Figure 17F:
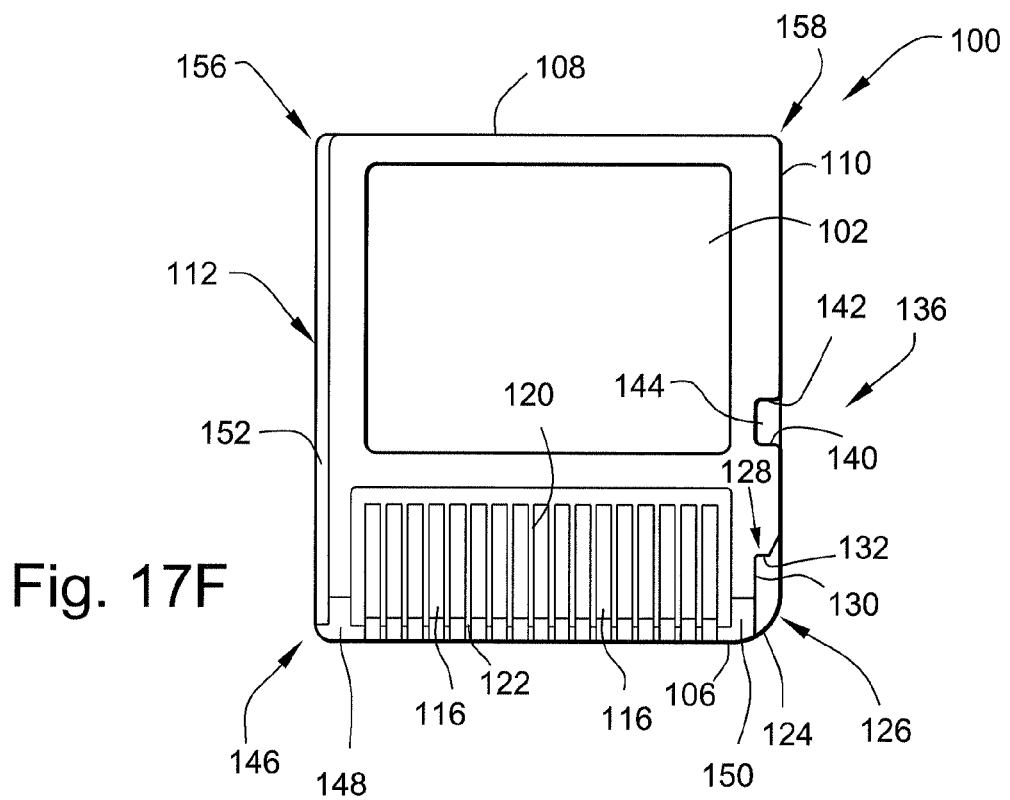
FIG. 17F is a plan view of a game card for use with the game device shown in FIGS. 1-4.
Figure 17G:
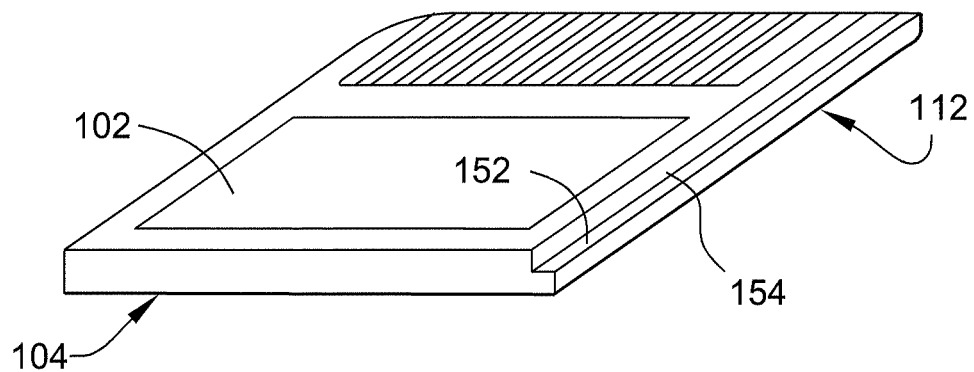
FIG. 17G is a rear perspective view of the game card shown in FIG. 6.
Figure 17H:
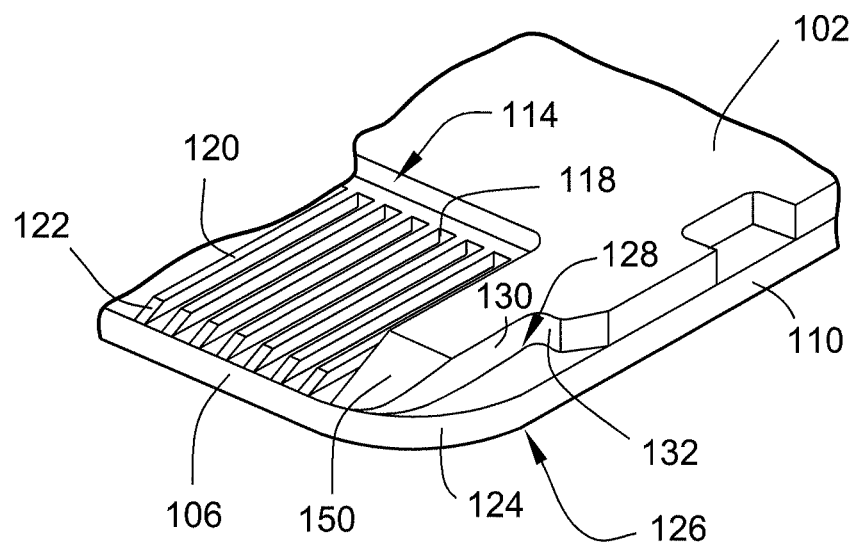
FIG. 17H is an enlarged perspective view of a front, right corner of the card shown in FIG. 6.

The new game or memory card 100 designed especially for use with this game device is shown in FIGS. 17F, 17G and 17H.

The game or memory card 100 is preferably of molded plastic construction and has substantially planar upper and lower surfaces 102, 104, respectively, a forward edge 106, rearward edge 108 and side edges 110, 112. The forward end of the upper surface 102 is formed with a rectangular recess 114 in which a plurality of terminal strips 116 are located, extending from a rear wall 118 of the recess to the forward edge 106 of the card. The rearward wall 115 of the recess is substantially perpendicular to the upper and lower surfaces 102, 104 but, as a practical matter, is sloped by no more than about 3 degrees simply to facilitate removal of the card from the mold during manufacture of the card. The terminal strips 116 are parallel to each other and are separated by raised ribs 120 that also extend from the rear wall 118 to the forward edge 106. The free ends 122 of the ribs 120 are chamfered as best seen in FIG. 8 to facilitate sliding entry of the card into the slot 58 in the main body 12. Ribs 120 also protect the terminal strips 116 from contact with the users' hands or other objects. The recess 114 and array of terminal strips 116 are not centered along the forward edge 106 of the card, but rather, are offset laterally toward the side edge 112 for a purpose explained in greater detail below.

An enlarged radius 124 is formed at forward corner 126 where the side edge 110 meets forward edge 106. A first notch 128 is formed in corner 126, defined by a vertical notch side wall 130, a vertical notch back wall 132 and a flat notch bottom wall 134. The latter is parallel to the upper and lower card surfaces 102, 104, while notch side wall 130 is parallel to side edges 110, 112, and notch back wall is perpendicular to the notch side wall 130 and parallel to the card forward edge 106. The depth of the notch is about half the approximate ⅛ inch thickness of the card, and the length of the notch is about ¼ inch, which in turn, is about half the length of the recess 114. Rearwardly of the notch 128, along the card side edge 110, there is formed a second notch 136 that opens to the side of the card, defined by parallel side walls 140, 142 and a back wall 144. Side walls 140, 142 are parallel to forward and rearward card edges 106, 108 while back wall 144 is parallel to card side edges 110, 112. An angled surface 145 connects back wall 144 to the edge 110. Here again, the depth of the notch is about half the thickness of the card, and the length of the notch is about ⅛ inch.

Notches 128 and 136 cooperate with components of a "push-push" mechanism inside the game slot 64 to provide controlled, spring-loaded movement of the game card during insertion and ejection.

The opposite forward corner 146 of the card where side edge 112 meets forward edge 106 is defined by a smaller radius than radius 124. Note that the forward surfaces 148, 150 of the card on either side of the recess 114 are also chamfered to substantially the same degree as the chamfer on ribs 120.

Side edge 112 is stepped along its entire length in the upper plane of the card only, as defined by horizontal shoulder 152 that is parallel to upper and lower surfaces 102, 104 and a recessed edge portion shoulder 154 that is parallel to the side edges 110, 112. This shoulder insures correct orientation of the card when inserted into a game console slot.

The rearward edge 108 of the card is substantially uniform in profile from side edge 110 to side edge 112, with both rearward corners 156, 158 rounded by a radii similar to the radius at corner 146.

The dimensions of the card are matched to the game machine entry slot, and in the exemplary embodiment, the card 100 is substantially square, with a length dimension (front-to-back) of 1⅜", and a width dimension (side-to-side) of 1¼".

FIG. 17I is a further illustrative embodiment of a portable game machine 200. As with the prior embodiment, a further exemplary game machine physically including two display screens with one of the display screens being covered with a touch panel is exemplarily described. In the present embodiment, a game image is displayed on at least the display screen covered with the touch panel. Also, a non-portable video game machine, an arcade game machine, a portable terminal, a cellular phone, or a personal computer may be used as the game machine.

FIG. 17I is an external view of the portable game machine 200. As shown in FIG. 17I, the portable game machine 200 includes two display screens, that is, a first display screen 211a and a second display screen 212a. The surface of the second display screen 212a is covered with a touch panel 213. Also, to the right of the second display screen 212a, the game machine includes an A button 214a, a B button 214b, and an R switch 214c, which are operable by the right hand of the player, and a loudspeaker 215 for producing game music. To the left of the second display screen 212a, the game machine includes a cross key 214d, a start button 214e, a select button 214f, and an L switch 214g, which are operable by the left hand of the player. Also, the portable game machine 200 includes a removable stylus 216 for input to the touch panel 213. Furthermore, the portable game machine 200 has, removably inserted therein, a cartridge 217, which is a storage medium having stored therein a game program of the illustrative embodiments. Note that, in the present embodiment, the touch panel 213 is exemplarily provided as an input unit, but this does not restrict the present invention.

Figure 17J:
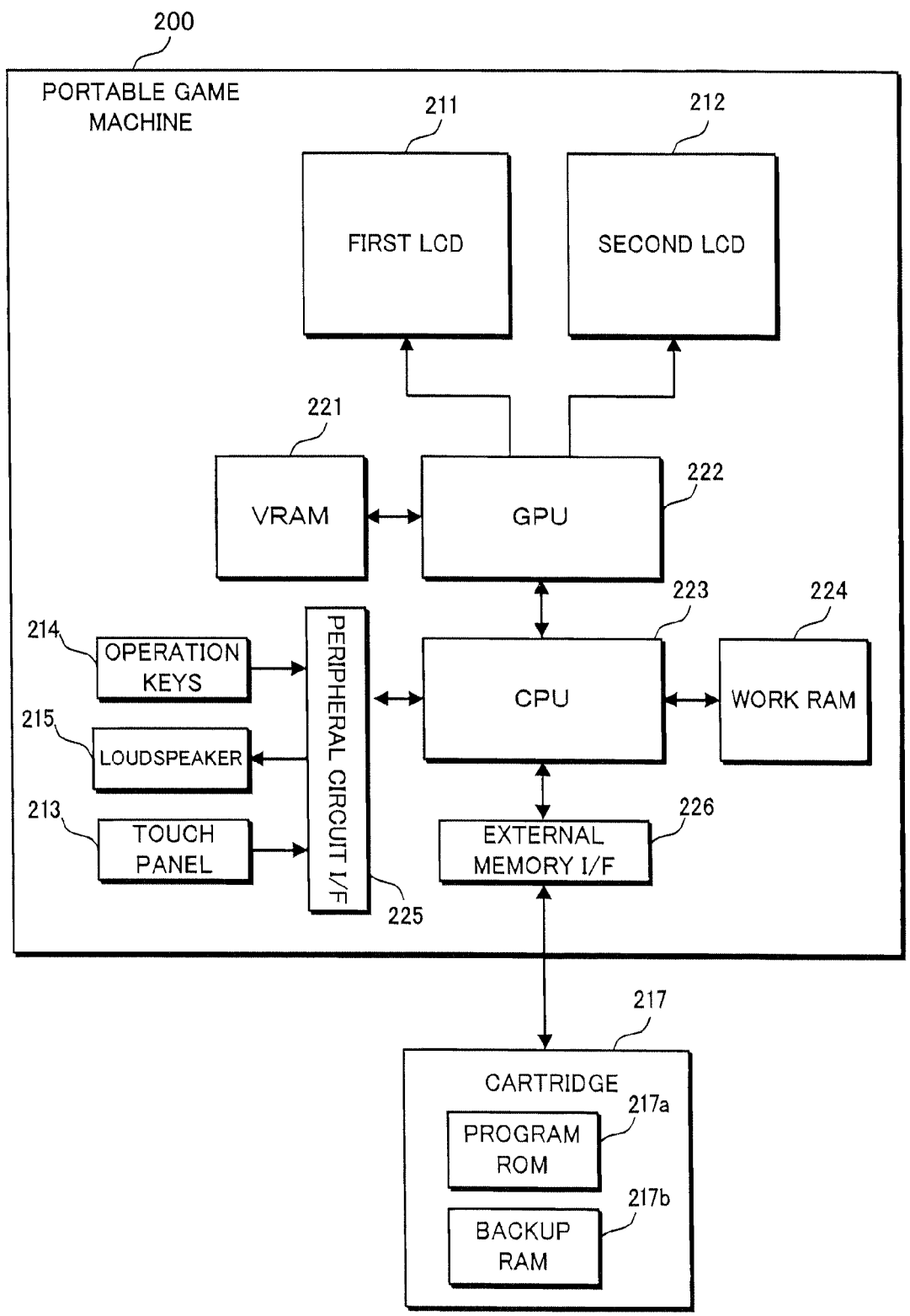
FIG. 17J is an illustration showing an internal configuration of a portable game machine.

FIG. 17J is a block diagram showing the portable game machine 200. It should be understood that the hardware/software and operational description which follows is applicable to the illustrative embodiment shown in FIGS. 17A-17H as well as the illustrative embodiment shown in FIG. 17J. As shown in FIG. 17J, the portable game machine 200 includes a CPU (central processing unit) 223, which is an example of a computer for executing the game program, and other components. The CPU 223 includes a work RAM (working storage unit) 224, a GPU (graphic processing unit) 222, and a peripheral circuit I/F (interface) 225 that are electrically connected to one another. The work RAM 224 is a memory for temporarily storing, for example, the game program to be executed by the CPU 223 and calculation results of the CPU 223. The GPU 222 uses, in response to an instruction from the CPU 223, a VRAM 221 to generate a game image for display output to a first LCD (liquid crystal display unit) 211 and a second LCD 212, and causes the generated game image to be displayed on the first display screen 211a of the first LCD 211 and the second display screen 212a of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input (specified) with the stylus 216.

Furthermore, the CPU 223 is electrically connected to the external memory I/F 226, in which the cartridge 217 is inserted. The cartridge 217 is a storage medium for storing the game program and, specifically, includes a program ROM 217a for storing the game program and a backup RAM 217b for rewritably storing backup data. The game program stored in the program ROM 217a of the cartridge 217 is loaded to the work RAM 224 and is then executed by the CPU 223. In the present embodiment, an exemplary case is described in which the game program is supplied from an external storage medium to the portable game machine 200. However, the game program may be stored in a non-volatile memory incorporated in advance in the portable game machine 200, or may be supplied to the portable game machine 200 via a wired or wireless communication circuit.

Figure 17K:
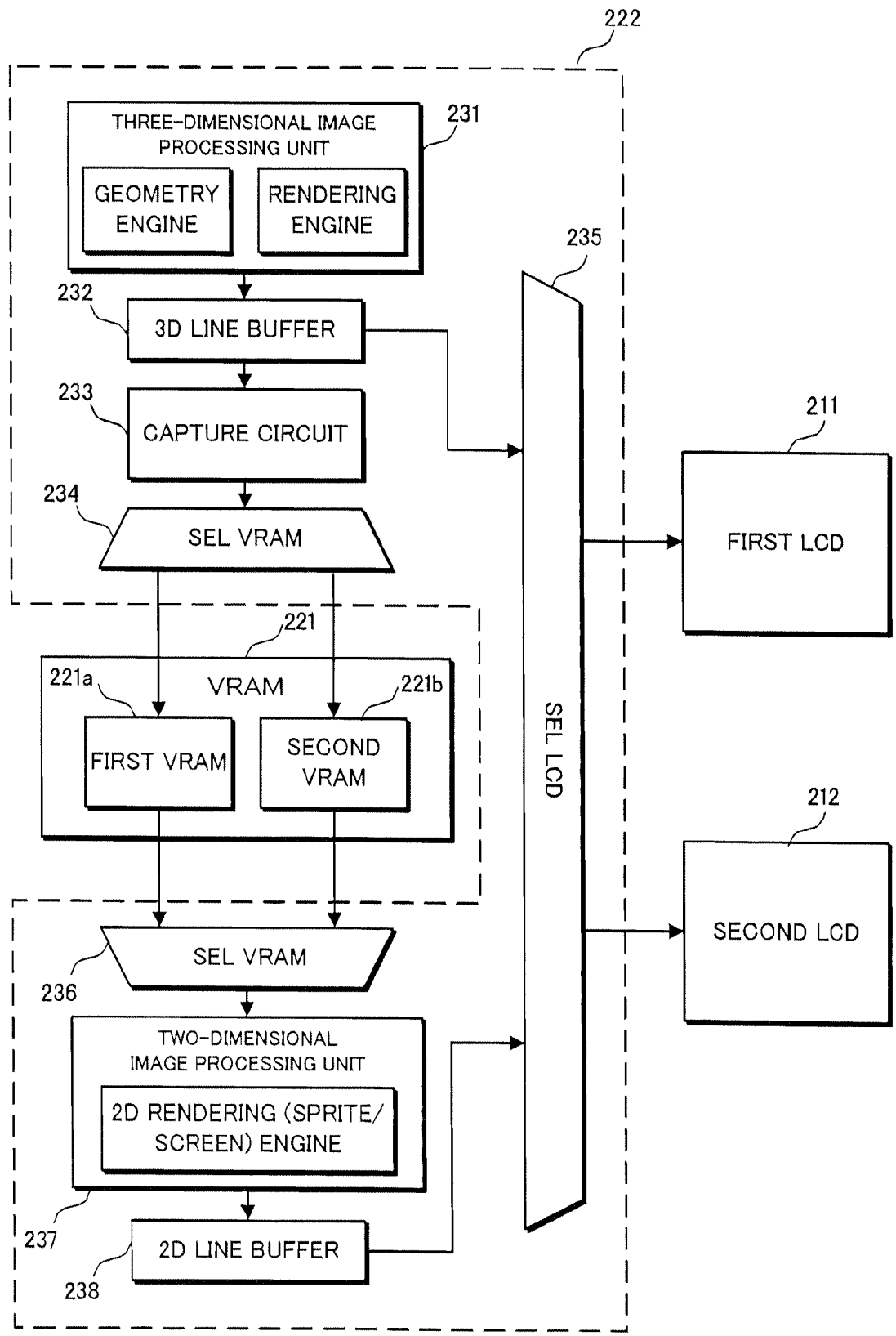
FIG. 17K is an illustration showing an internal configuration of a GPU 222.

FIG. 17K is a block diagram of the GPU 222. The GPU 222 includes two image processing units, that is, a three-dimensional image processing unit 231 and a two-dimensional image processing unit 237. The three-dimensional image processing unit 231 includes a geometry engine for calculating each vertex of a three-dimensional model based on three-dimensional model data and a rendering engine for generating a game image from the three-dimensional model disposed on a virtual three-dimensional game space. The two-dimensional image processing unit 237 includes a 2D rendering engine for generating a game image based on two-dimensional image data representing characters and two-dimensional image data representing backgrounds. More specifically, the two-dimensional image processing unit 237 disposes a two-dimensional image representing a character on a virtual screen called a "sprite" and a two-dimensional image representing a background on a virtual screen called a "screen", and then synthesizes these virtual screens to generate a game image to be eventually displayed.

The three-dimensional image processing unit 231 is connected to the 3D line buffer 232. The 3D line buffer 232 is a buffer memory for temporarily retaining image data for one scanning line of the first LCD 211 (or the second LCD 212). The image data generated by the three-dimensional image processing unit 231 is stored in this 3D line buffer 232 sequentially by one line.

The 3D line buffer 232 is connected to a capture circuit 233 and an LCD selector (SEL LCD) 235. The capture circuit 233 sequentially reads image data for one line stored in the 3D line buffer 232 and then sequentially stores the read image data in the VRAM 221, which will be described further below, thereby capturing the game image generated by the three-dimensional image processing unit 231.

The capture circuit 233 is connected to a VRAM selector (SEL VRAM) 234. The VRAM 221 is provided with two VRAMs, that is, a first VRAM 221a and a second VRAM 221b. Instead of these two first and second VRAMs 221a and 221b, a single VRAM may be used with its two different storage areas being used as the first VRAM 221a and the second VRAM 221b. The VRAM selector 234 switches an output destination of the capture circuit 233 between the first VRAM 221a and the second VRAM 221b.

The first VRAM 221a and the second VRAM 221b are connected to a VRAM selector (SEL VRAM) 236. The VRAM selector 236 switches a source of data to the two-dimensional image processing unit 237 between the first VRAM 21a and the second VRAM 221b.

The two-dimensional image processing unit 237 is connected to a 2D line buffer 238. As with the 3D line buffer 232, the 2D line buffer 238 is a buffer memory for temporarily retaining image data for one scanning line of the second LCD 212. The image data generated by the two-dimensional image processing unit 237 is stored in this 2D line buffer 238 sequentially by one line.

The 2D line buffer 238 is connected to an LCD selector 235. The LCD selector 235 switches an output destination of the 3D line buffer 232 between the first LCD 211 and the second LCD 212, and an output destination of the 2D line buffer 238 between the first LCD 211 and the second LCD 212. In the present embodiment, the LCD selector 235 performs control such that, when the output of the 3D line buffer 232 is supplied to the first LCD 11, the output of the 2D line buffer 38 is supplied to the second LCD 212, and when the output of the 3D line buffer 232 is supplied to the second LCD 212, the output of the 2D line buffer 238 is supplied to the first LCD 211.

The portable game machine 200 has the above-described structure. Generally, the game image generated by the three-dimensional image processing unit 231 is supplied via the 3D line buffer 232 and the LCD selector 235 to the first LCD 211, while the game image generated by the two-dimensional image processing unit 237 is supplied via the 2D line buffer 238 and the LCD selector 235 to the second LCD 212. As a result, the three-dimensional game image generated by the three-dimensional image processing unit 231 is displayed on the first display screen 211*a*, while the two-dimensional game image generated by the two-dimensional image processing unit 237 is displayed on the second display screen 212*a*. However, the present embodiment has a feature in which the above-structured portable game machine 200 is used to display different three-dimensional game images on two display screens, that is, the first display screen 211*a* and the second display screen 212*a*. Hereinafter, the operation of the portable game machine 200 according to the present embodiment is described.

The portable game machine 200 alternately performs operations with periods of one frame. Hereinafter, the operation of the portable game machine 200 is described as being divided into a process in an odd-numbered frame and a process in an even-numbered frame. Note that the "odd-numbered frame" and the "even-numbered frame" are merely so called for convenience. In other words, if one frame is assumed to be an odd-numbered frame, frames before and after that frames are even-numbered frames. Conversely, if one frame is assumed to be an even-numbered frame, frames before and after that frames are odd-numbered frames.

Figure 17L:
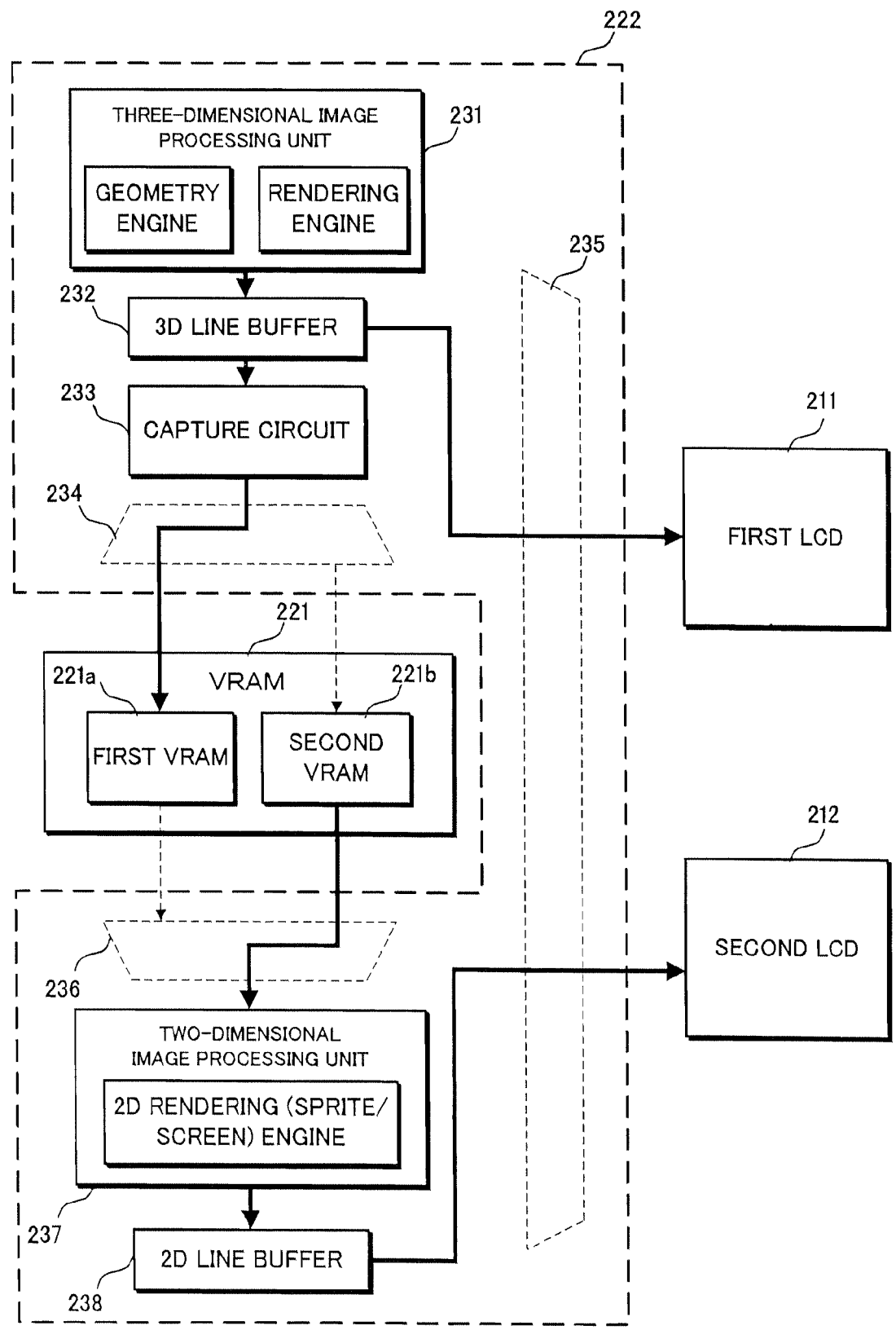
FIG. 17L is an illustration showing the operation of a portable game machine in an odd-numbered frame.

FIG. 17L is an illustration showing the operation of the portable game machine 200 in an odd-numbered frame. As shown in FIG. 12, in the odd-numbered frame, the game image generated by the three-dimensional image processing unit 231 is supplied via the 3D line buffer 232 to the first LCD 211. Also, the output from the capture circuit 233 is supplied to the first VRAM 221*a*. That is, the game image supplied in this frame to the first LCD 211 is captured by the capture circuit 233, and is then stored in the first VRAM 221*a*. Also, the two-dimensional image processing unit 237 reads the game image stored in the second VRAM 221*b* (the game image captured in the immediately-preceding even-numbered frame by the capture circuit 233, as will be described further below). This game image is, as will be described further below, identical to the game image supplied in the immediately-preceding even-numbered frame to the second LCD 212. The game image read by the two-dimensional image processing unit 237 is supplied via the 2D line buffer 238 to the second LCD 212. As such, in the odd-numbered frame, the game image generated in this frame by the three-dimensional image processing unit 231 is supplied to the first LCD 211, while the game image generated in the immediately-preceding even-numbered frame by the three-dimensional image processing unit 231 is supplied to the second LCD 212.

Figure 17M:
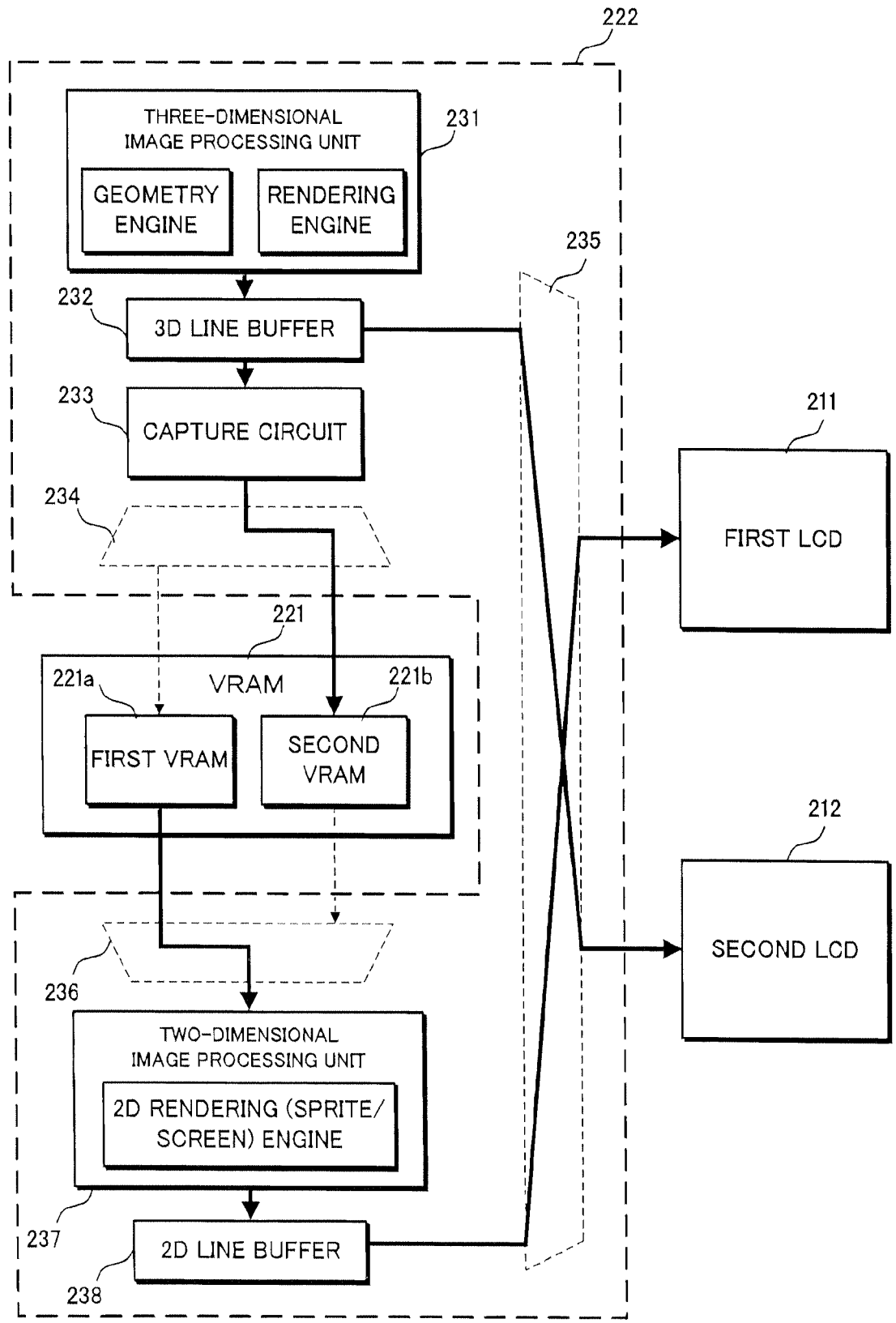
FIG. 17M is an illustration showing the operation of a portable game machine in an even-numbered frame.

FIG. 17M is an illustration showing the operation of the portable game machine 200 in an even-numbered frame. As shown in FIG. 13, in the even-numbered frame, the game image generated by the three-dimensional image processing unit 231 is supplied via the 3D line buffer 232 to the second LCD 212. Also, the output from the capture circuit 233 is supplied to the second VRAM 221*b*. That is, the game image supplied in this frame to the second LCD 212 is captured by the capture circuit 233, and is then stored in the second VRAM 221*b*. Also, the two-dimensional image processing unit 237 reads the game image stored in the first VRAM 221*a* (the game image captured in the immediately-preceding odd-numbered frame by the capture circuit 233, as will be described further below). This game image is identical to the game image supplied in the immediately-preceding odd-numbered frame to the first LCD 211. The game image read by the two-dimensional image processing unit 237 is supplied via the 2D line buffer 238 to the first LCD 211. As such, in the even-numbered frame, the game image generated in this frame by the three-dimensional image processing unit 231 is supplied to the second LCD 212, while the game image generated in the immediately-preceding odd-numbered frame by the three-dimensional image processing unit 231 is supplied to the first LCD 211.

Figure 19:
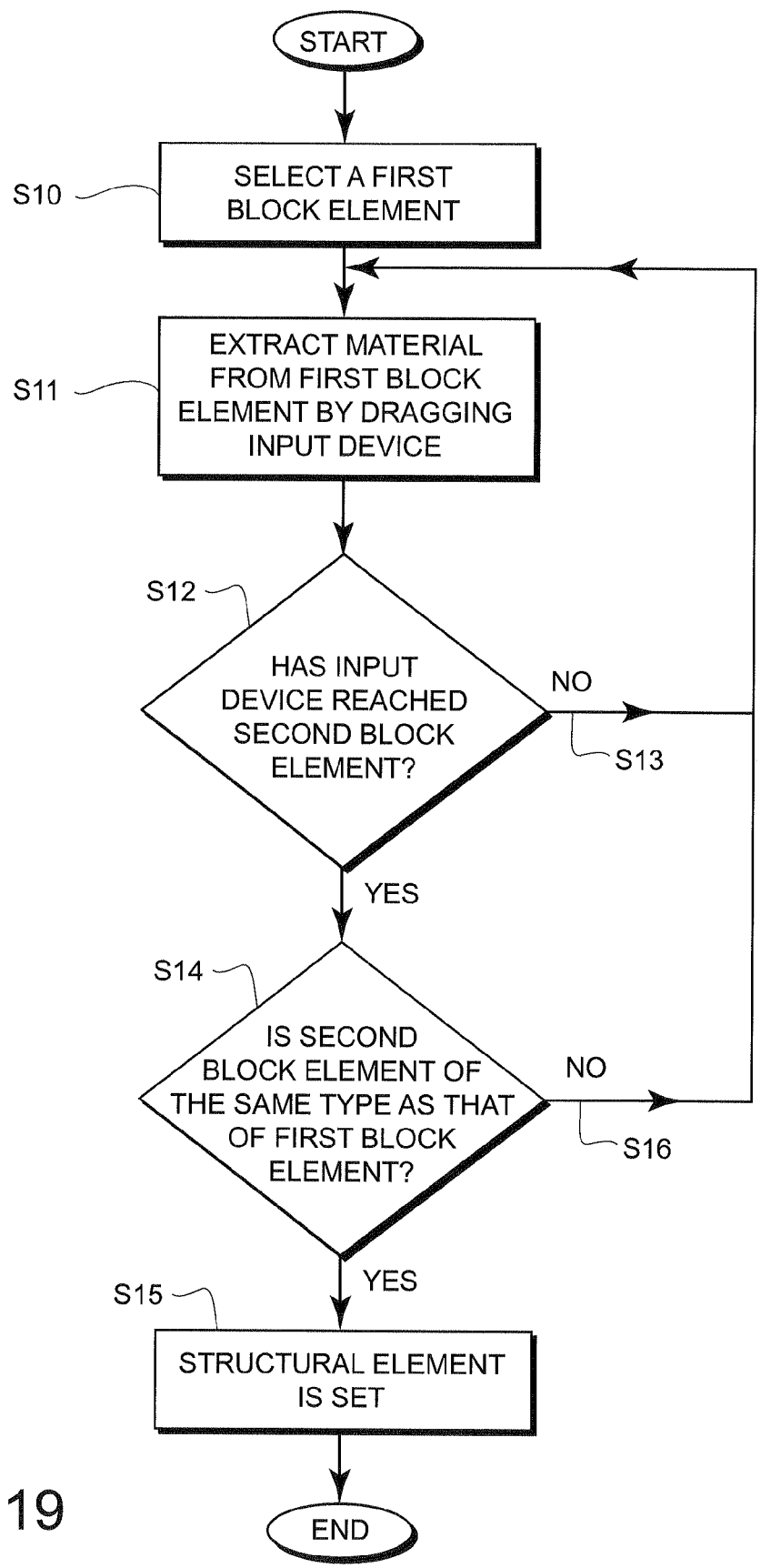
FIG. 19 shows an exemplary illustrative non-limiting software flowchart.

FIG. 19 shows an exemplary illustrative non-limiting software flowchart for a method for modifying the game space of a video game displayed on a display screen according to a program stored in a storage medium used in conjunction with the game machine having a hardware structure as shown in FIGS. 17J and 17K. First, in step S10, the user selects a first block element in the game space, by touching on the block element with an input device. Next, in step S11, the user extracts material from the first block element by dragging the input device while touching on the touch display of the display screen and moving away from the first block element.

Next, the program checks to see if the input device has reached a second block element in step S12. In step S13, if the input device while being dragged away from the first block element has not reached another block element, then the program goes back to step S11, and more material continues to be extracted from the first block element. On the other hand, if the input device has reached a second block element, then the program checks to see if the second block element is of the same type as that of the first block element (step S14).

If the second block element is of different type as that of the first block element, then in step S16 the program moves back to step S11. However, if the first and second block elements are of the same type, then a structural element corresponding to the type of the first and second block elements is set between the first and second block elements, when the user releases the input device from the area on the touch panel corresponding to the second block element (step S15), and the method ends.

Some attributes of an editor used in the above example embodiments are listed below:

Bounds: Minimum width, height an object occupies.
Memory Footprint: Amount of space an object takes from an edit stage allocated amount.
Extendable: Indicates if this object is extendable, e.g. ladders
Flip Capable: Indicates if an object is capable of being flipped.
Insert Mode: Indicates possible methods of placement.

One click based: An object which can be placed with a stylus press and release
Drag capable: An object which can be placed with a stylus press and drag
Horizontal only
Vertical Only
Horizontal and Vertical Free Form
Insert Restrictions: Indicates if placement restriction for an object exists.
    Place able only against a support base
        Horizontal Base
            Above Base
            Below Base
            On either side of base
        Vertical Base
            On Right Side of Base
            On Left Side of Base
            On either side of base
    Placement requires minimum screen space dimension
Can Overlap: Indicates if an object can overlap over other objects.
Snap Point: Indicates if there are placement grid snap point requirements.
    Allowed Points
        Grid Square Point: (top-left)
        Grid Square Point: (top-center)
        Grid Square Point: (top-right)
        Grid Square Point: (mid-left)
        Grid Square Point: (center)
        Grid Square Point: (mid-right)
        Grid Square Point: (bottom-left)
        Grid Square Point: (bottom-center)
        Grid Square Point: (bottom-right)

A template file contains a minimum requirement list for an editable stage. There are 3 different types of template files and the content of each is listed below.
    Template File Types
    1) Stage Mini Mario
        2 Mini Mario's
        1 Exit Door Basic
        1 Card
        A Base Floor (covers the width of a stage layout)
    2) Stage Mini Mario With Key
        1 Mini Mario
        1 Mini Mario With Key
        1 Exit Door Basic Locked
        1 Card
        A Base Floor (covers the width of a stage layout)
    3) Stage Multi-Door
        1 Mini Mario
        1 Other Toy Capsule [Princess, Toad, Donkey Kong or Pauline]
        1 Mini-Mario Door
        1 Other Exit Door [Princess, Toad, Donkey Kong or Pauline]
        1 Card
        A Base Floor (covers the width of a stage layout)

Editable stage files are created for each World with a predetermined layout using the objects in the template file as well as objects from the specific World the stage represents. The objects that are included in a template file cannot be erased from the stage and are a requirement for the stage.
    Base Floor
    One of the elements available and required in each editable stage is a Base Floor. This refers to a set of ground surface objects that span the width of a stage and lay on the bottom edge of a map.

An object in the base floor position is always of either Surface type or an object from a selective list of Moveable's*. Objects on the base floor cannot be erased. However, although an object cannot be deleted, each object which forms the Base Floor can be altered to any Surface type and therefore be switched by inserting any Surface oject over it.
E.g., if the Base Floor contains a Ground Basic object, it can be switched to a Ground Spikes object by placing one over it. If in turn, the Ground Spike object were to be erased, the original object which was loaded from the template file would reappear back in place.
*A selective list of objects of Moveable type which are capable of being inserted on the Base Floor.
    Moveable Types Allowed on Base Floor
        Rivet Red Girder
        Rivet Blue Ladder
        Rivet Purple Conveyer
        Green Moveable Pipe Split
        Shadow (empty)
        Filled-in Below is a description of major editing functions provided by the In-Game Editor.
1) Insert Tool
The Insert Tool places objects from an object library onto the main canvas. Methods of inserting objects into a canvas include the following:
a. One-click Based
An object placed with a stylus press and release.
b. Drag Based
An object which is placed with a stylus press and dragged for added functionality (e.g. extend a Ladder). Drags supported are of the following kind provided the object being placed supports additional drag placement behavior:
    Horizontal Drag-Movement is restricted to left or right drag only.
    Vertical Drag-Movement is restricted to up or down drag only.
    Horizontal and Vertical Free Form Drag—No movement restrictions.
2) Erase Tool
The Erase Tool removes and erases an object from the main canvas. Methods of erasing objects from a canvas include the following:
a. Grid Space With Content
The stylus was pressed on a grid space containing an object.
    i. One-click based
    If the stylus was pressed and released on an object in the:
        1. Canvas Area
            Clicking on an object which lies in the main Canvas Area erases the object.
        2. Base Floor
            If a Surface object is erased from the Base Floor the default Base Floor object included in a Template reappears.
b. Grid Space With No Content
The stylus was pressed on an empty grid space.
    i. One-click Based
The stylus was pressed and released on an empty space. Nothing happens. The world is safe.
    ii. Drag Based
The stylus was pressed, held and dragged from an empty grid space. Doing so a visible select box draws over the objects it completely overlaps. Upon release, any object which is capable of being erased is removed from the canvas.

3) Move Tool

The Move Tool allows objects to be translated around the canvas.
  a. Grid Space With Content
  The stylus was pressed on a grid space containing an object.
    i. One-click based
    If the stylus was pressed on an object in the:
      1. Canvas Area
        Clicking on an object which lies in the main Canvas Area highlights the object indicating that it is currently selected.
      2. Base Floor
        If a Surface object is not a default object from the Base Floor, the object clicked on highlights indicating that it is currently selected.
    ii. Dragged
    If a highlighted object gets dragged, the object translates with the stylus movement.
    iii. Released
    Provided that the object is released on a valid grid space, the object is moved. If the grid space is considered invalid, the object would return to the location it occupied before the attempt of translation began.
    * For a space to be considered valid there are rules and restrictions which apply regarding overwriting.
  b. Grid Space With No Content
  The stylus was pressed on an empty grid space.
    i. One-click Based
    The stylus was pressed and released on an empty space. Nothing happens. The world is safe.
    ii. Drag Based
    The stylus was pressed, held and dragged from an empty grid space. Doing so a visible select box draws over the objects it completely overlaps. Upon release, any object which is capable of being erased, is removed from the canvas.

4) Flip Tool

The Flip Tool allows objects containing a flip attribute to transform horizontally or vertically. When initiated, objects which are not capable of flipping dim-out in order to let the user focus on objects which are capable of flipping. The Flip Tool works on a one-click based system. This is to say, if a flip capable object got selected with a stylus press, it flips.

Surfaces

Surface objects carry the highest priority during editing. This priority includes the ability to erase any object it is placed over with the exception that it cannot erase any object required by a Template.

1) Insert Mode

An object of Surface type gets inserted into a grid space in the following way.
  a. Stylus Press
  When the stylus is pressed on a grid space there are two possibilities:
    i. On An Empty Grid Space
      A tile is placed on the top left corner of the grid space. This corner is considered the origin of the current placement.
    ii. On A Filled Grid Space
      If the grid space already contains an object, there are some conditions to consider:
      1. Grid Space Currently Filled With Object Required by Template.
        a. An object which falls into the requirement rules set by a Template is required and thus cannot be erased. The surface attempting to be placed displays on screen erroneously.
        b. In the case where a Surface object is being placed over a Surface object on the Base Floor a substitution is allowed.
      2. Grid Space Currently Filled With Object Allowing Overlap.
        If a grid space is filled with an object allowing overlap, and the current Surface object being inserted intersects it, the Surface object being inserted would appear below the object in the current grid space.
      3. Grid Space Currently Filled With Object.
        Any object which gets overlapped by the currently placed surface object gets erased from the stage.
  b. Stylus Drag
  With the stylus held down, a user decides to drag across the screen to insert multiple Surface objects.
    i. As the stylus is dragged, an invisible bounding box gets created between the origin and current held point with the corresponding Surface objects displaced.
    ii. Stylus drags are recognized only in one axis at a time. If a drag begins horizontally from the origin, vertical movement would be ignored. At this point, if the stylus returns to the grid space at the origin of the bounding box. A user could now decide to create vertical placement instead and in turn, horizontal movement would be ignored.
    iii. If the stylus is dragged over a grid space which would disallow Surface placement, the Surface objects currently being laid out show up erroneously.
  c. Stylus Release
  Once a stylus is released Surface objects are either inserted or erased.
    i. Good Placement.
      1. Surface objects are placed on the corresponding grid spaces.
      2. Any object overlapped by the Surface objects being placed which do not allow the overlap attribute disappear as if it had been erased.
    ii. Erroneous Placement.
      1. Surface objects, which should currently be displayed erroneously, disappear as if they had been erased.

2) Erase Mode

A ground piece can be erased by clicking on it with the eraser.
  a. Base Floor
  If a Surface object is erased from the Base Floor the default Base Floor object included in a Template reappears.
  b. Canvas Area
  Clicking on a ground piece erases a single unit of ground.

3) Move Mode

The Move Tool moves any piece which has been highlighted.

4) Flip Mode

Ground pieces cannot be flipped.

Ladder

Insert Mode

When a Ladder is inserted, it is done with a default size occupying 1 grid space. While the stylus still pressed during initial placement of the Ladder, it is possible to drag the stylus up or down to extend its length. If while extending, a stylus drag overlaps the opposite edge, the Ladder would continue extending in the direction dragged beginning from the opposite edge overlapped. While the stylus is still being held down on the Ladder, a horizontal drag initiates Move Mode and disables extend capabilities. From this point up till the ladder is placed (the stylus is lifted), the Ladder can only be displaced. Because extend mode is disabled after a horizontal drag and Move Mode is entered, vertical drags displaces a Ladder in the direction dragged.

Move Mode

During Move Mode, certain restrictions apply depending on which size Ladder is being moved.

Moving Short Ladders

Pressing upon a ladder piece of a Ladder which does not contain mid-blocks (i.e. a Ladder which is either one or two blocks tall) with the stylus during the editors Move Mode makes it possible to extend vertically the length of the ladder by dragging the sylus up or down.

If a horizontal drag were applied on a short Ladder, the Move Tool would allow translation to its position in any, vertical or horizontal, direction until the stylus is released.

Moving Tall Ladders: Grabbed by a Top or Bottom Edge

Should a Ladder containing mid-blocks (i.e. a Ladder three or more blocks in height), be pressed on either the top most, or bottom most, piece allows the Ladders height to be extended up or down.

If an edge piece (top or bottom) of the Ladder gets a horizontal drag the Ladder is displaced horizontally and disables extend capabilities. From this point up till the ladder is placed (the stylus is lifted), the Ladder can only be displaced.

Moving Tall Ladders: Grabbed by a Mid-Block If a Ladder is grabbed through a mid-block piece, the Ladder would not be allowed to be extended. Instead, only translation is possible.

Restrictions

A Ladder cannot replace objects on the Base Floor. This is restricted because a Toy would be unable of ever entering it. Also, in the case that a Toy was to enter this ladder from the top in order to climb down, the Toy would drop off the stage boundaries.

Ground Conveyer Belt

Insert Mode

When a Ground Conveyer Belt is inserted, it occupies 2 grid spaces horizontally. The two pieces inserted represent the end caps of Ground Conveyer Belt. During insert, dragging the stylus in a horizontal direction extends horizontally the length of the Ground Conveyer Belt.

Move Mode

Pressing the left or right piece of a Ground Conveyer Belt with the stylus during the editors Move Mode makes it possible to extend horizontally the length of the Ground Conveyer Belt by dragging the stylus horizontally. If a vertical drag were applied instead, the Ground Conveyer Belt would be allowed to translate its vertical position in the dragged direction until the stylus is released.

Ground Magnet Spin

Insert Mode

This object follows the same conventions as the Ground Conveyer Belt but instead of occupying 2 grid spaces, the default grid spaces it occupies are 4 grid spaces horizontally.

The grid space at either extreme are of a of a spin texture type, while the middle two consist of the magnet spin floor texture type.

A minimum of 4 grid spaces is required. That is to say, a Ground Magnet Spin cannot be shorter than 4 grid blocks. This restriction is in place so that Toys walking on the surface have enough 'space' to walk upon while this ground type is being triggered. When this object gets placed, the grid spaces above the magnet spin floor texture type get reserved and occupied so that no other ground surfaces can be placed over it. This is done to avoid awkward collisions from occurring when the object is activated. Similarly, objects with special functions (e.g. springs) may not be placed above the Ground Magnet Spin floor in order to avoid these objects to be flipped over as they will not function correctly.

Move Mode

This object follows the same conventions as the Ladder but instead of extending vertically, the Ground Magnet Spin object extends horizontally.

Restrictions

A Ground Magnet Spin object can only be placed provided the space above and below the middle pieces (the tiles of floor which flip) have a minimum of 2 vertical grid spaces unoccupied by objects of Surface type. This restriction is applied because in the case when the Ground Magnet Spin gets activated (flips over), any character which flips with the Ground Magnet Spin would collide awkwardly.

Pipes

General Placement Rules

Below is an in depth breakdown describing Pipe placement

1) Insert Mode a. Stylus Press

A Pipe is placed by default in a horizontal position. When placed it occupies 6 grid spaces with the center point snapping to the closest grid space beneath the stylus press. The center point is now considered the origin of the Pipe placement. While the stylus is still held down, there are 3 Regions which are invisible to a user. These 3 Regions (R1, R2, R3) allow a user placing a Pipe 3 options to continue editing:

Bend the Pipe

Rotate the Pipe

Extend the Pipe

Move, the ability to translate the origin of the Pipe, is not an option while the Pipe is being held with the stylus on initial placement.

b. Stylus Drag

With the stylus still held down, a stylus drag can extend and/or bend the Pipe.

i. With a horizontal drag, the Pipe extends one grid space at a time as the stylus moves over new grid spaces.

ii. A vertical drag causes the Pipe to bend in the vertical direction moved.

iii. If during insert and with the stylus still at its origin, a stylus drag in a vertical direction causes the Pipe to rotate 90 degrees to be placed in a vertical position.

Updating Region 3 (R3) after an Extension

After an extension, the regions for stylus drag detection reduce to one bounding region.

With the stylus having been dragged to the right, a new detection bounding region is created at the edge of the Pipe and extends out by a space equivalent to 0.5 grid space. Once an extension has begun, the options for a user alter. The editing possibilities get reduced to two options: Extend and Bend.

If a drag were to be initiated were the stylus would cross the left most edge of the detection region, the Pipe would shorten to its original placement state c. Stylus Release Once the stylus is released, the Pipe is laid out.
  i. Pipes can overwrite Surface objects only.
  ii. If a Pipe is placed over any other object besides Surfaces, it is considered erroneous and should disappear on release as if it were erased.

Pipe Collision

When editing a Pipe, it is disallowed for a Pipe to cross over itself (or another Pipe). In layout cases where a Pipe might cross over itself (or another Pipe) input in such direction is ignored.

2) Erase Mode

A stylus press over an object erases it from the stage.

3) Move Mode
  a. Stylus Press Over Middle Region
    A Pipe can be dragged while it is highlighted.
    Drag Behavior
      i. Drags the object to closest snap point.
      ii. If the object dragged overlaps another object, the object being dragged draws erroneously.
      iii. If the object is released while in an erroneous state, the object returns to its previous position.
  b. Stylus Press Over Edges
    If a stylus lands on either region containing the entrance/exit of the Pipe (R1 or R3), the editing behavior of the Pipe follows the same behaviors described during Insert Mode pertaining extensions.

4) Flip Mode
  a. Stylus Press
    Pipes cannot be flipped.

Rivets and Corresponding Partners

Below is a breakdown describing Rivets and their corresponding partners such as Red Girders, Purple Conveyer Belts and Blue Ladders.

1) Inserting Connections between Rivets

While no rivets have been placed on a grid scene, it is not possible to place any of the corresponding partners (Girders, Ladder or Conveyers) and thus by, be grayed out in the Object Window in order to indicate to the user their inaccessibility. Once two Rivets of the same type are placed, its corresponding partner becomes accessible through the Object Window. To place the connecting objects of a Rivet type, a user selects the object and draws a line from Rivet to Rivet.

2) Moving Rivets with Connections

If a Rivet with connections is moved by a user, any connecting objects attached to it automatically get erased.

Blue Rivet Restrictions

Although Red and Purple Rivets can be placed anywhere, Blue Rivets (Ladders) have some restrictions. Blue Rivets are limited to a count of two within a single grid column. This restriction comes about due to the behavior of characters which use ladders. If a character were to come across a point where two ladders connect to make one big ladder, a character would not know which direction to climb (up or down).

Conveyer Rivet Restrictions

The Purple Conveyer behaves similar to the Red Girders, with the difference of how the connection points are drawn. The stylus drag direction used to connect Purple Rivets defines the direction of which the Purple Conveyer will travel on star, e.g. if the drag direction to connect 2 Purple Rivets was from left to right defines the Purple Conveyer rotating towards the right when the stage begins.

As one embodiment of the present invention, the portable game machine having a hardware structure as shown in FIGS. 17J and 17K has been described. However, the present invention is applied not only to the portable game machine having such a hardware structure, but to the one having the above hardware structure achieved by the CPU and software. Also, the portable game machine according to the present embodiment can be emulated by a computer system, such as a personal computer or a portable information terminal. In this case, a game program that causes the computer system to achieve each hardware function of the portable game machine according to the present embodiment is supplied to the computer system. With this, the present invention can be applied also to a general-purpose computer system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method for modifying a game space displayed on a display screen comprising a touch panel on a surface thereof, by entering structural elements in the game space, said game space being associated with a video game, said method comprising:
   selecting a first block element in the game space by using an input device to touch on an area of the touch panel substantially corresponding to the first block element;
   forming a structural element originating from the first block element by dragging the input device from the area substantially corresponding to the first block element towards an area substantially corresponding to a second block element of the same type as that of the first block element in the game space;
   while continuously dragging the input device towards the area substantially corresponding to the second block element, reaching said area;
   releasing the input device from the touch panel, wherein
   after the release of the input device, the structural element is formed between the first block element and the second block element, wherein
   the type of the structural element formed between the first and the second block element depends on the type of the first and second block element.

2. The method according to claim 1, wherein said structural element is one of a girder, a conveyor belt, or a ladder.

3. A non-transitory computer readable storage medium having stored therein an image processing program executed by a computer of an image processing apparatus for modifying a game space displayed on a display screen comprising a touch panel on a surface thereof, by entering structural elements in the game space, said game space being associated with a video game, said image processing program causing said computer to:
   select a first block element in the game space in response to a user using an input device to touch on an area of the touch panel substantially corresponding to the first block element;
   form a structural element originating from the first block element while the input device is dragged from the area substantially corresponding to the first block element towards an area substantially corresponding to a second block element of the same type as that of the first block element in the game space;

continue forming the structural element while the input device is continuously dragged towards the area substantially corresponding to the second block element, the input device reaching said area; and the input device is released from the touch panel, wherein after the release of the input device, the structural element is formed between the first block element and the second block element, wherein the type of the structural element formed between the first and the second block element.

4. The non-transitory computer readable storage medium according to claim 3, wherein said structural element is one of a girder, a conveyor belt, or a ladder.

5. An image processing system for modifying a game space displayed on a display screen comprising a touch panel on a surface thereof, by entering structural elements in the game space, said game space being associated with a video game, the image processing system comprising:

a computer processor configured to select a first block element in the game space in response to a user using an input device to touch on an area of the touch panel substantially corresponding to the first block element;

form a structural element originating from the first block element while the input device is dragged from the area substantially corresponding to the first block element towards an area substantially corresponding to a second block element of the same type as that of the first block element in the game space;

continue forming the structural element while the input device is continuously dragged towards the area substantially corresponding to the second block element, the input device reaching said area; and the input device is released from the touch panel, wherein after the release of the input device, the structural element is formed between the first block element and the second block element, wherein the type of the structural element formed between the first and the second block element depends on the type of the first and second block element.

6. The image processing system according to claim 5, wherein said structural element is one of a girder, a conveyor belt, or a ladder.

* * * * *